US011368497B1

(12) United States Patent
Sathyanarayana Rao et al.

(10) Patent No.: US 11,368,497 B1
(45) Date of Patent: Jun. 21, 2022

(54) SYSTEM FOR AUTONOMOUS MOBILE DEVICE ASSISTED COMMUNICATION

(71) Applicant: AMAZON TECHNOLOGIES, INC., Seattle, WA (US)

(72) Inventors: Shambhavi Sathyanarayana Rao, Seattle, WA (US); Tony Roy Hardie, Seattle, WA (US); Anna Chen Santos, Mountain View, CA (US)

(73) Assignee: AMAZON TECHNOLGIES, INC., Seattle, WA (US)

( * ) Notice: Subject to any disclaimer, the term of this patent is extended or adjusted under 35 U.S.C. 154(b) by 132 days.

(21) Appl. No.: 16/134,643

(22) Filed: Sep. 18, 2018

(51) Int. Cl.
| | |
|---|---|
| *H04L 65/10* | (2022.01) |
| *H04L 67/306* | (2022.01) |
| *H04W 4/70* | (2018.01) |
| *B25J 9/00* | (2006.01) |
| *H04W 4/029* | (2018.01) |
| *G10L 15/22* | (2006.01) |
| *G06V 40/16* | (2022.01) |

(52) U.S. Cl.
CPC ........ *H04L 65/1006* (2013.01); *B25J 9/0003* (2013.01); *G06V 40/161* (2022.01); *G10L 15/22* (2013.01); *H04L 67/306* (2013.01); *H04W 4/029* (2018.02); *H04W 4/70* (2018.02)

(58) Field of Classification Search
CPC .............................. H04W 4/029; B25J 9/0003
USPC ......................................................... 709/228
See application file for complete search history.

(56) References Cited

U.S. PATENT DOCUMENTS

| | | | | |
|---|---|---|---|---|
| 7,715,881 B1 * | 5/2010 | Liu | ...................... | H04M 1/2749 455/564 |
| 8,447,863 B1 * | 5/2013 | Francis, Jr. | ......... | G06F 16/2468 709/226 |
| 9,205,886 B1 * | 12/2015 | Hickman | ............. | G05D 1/0246 |
| 9,762,729 B1 * | 9/2017 | Sales | ................... | H04L 65/1069 |
| 9,854,206 B1 * | 12/2017 | Ren | ........................ | H04N 7/147 |
| 10,880,470 B2 * | 12/2020 | Buibas | ............... | H04N 5/23222 |
| 11,209,887 B1 * | 12/2021 | Jung | ..................... | H02J 7/0021 |
| 2007/0058637 A1 * | 3/2007 | Lo | ....................... | H04L 65/1083 370/395.2 |
| 2008/0016544 A1 * | 1/2008 | Lee | .................... | H04N 21/4333 725/134 |

(Continued)

OTHER PUBLICATIONS

James Cameron, script for "Terminator", Apr. 20, 1983, https://www.scriptslug.com/script/the-terminator-1984, scene 33A.*

*Primary Examiner* — Douglas B Blair
(74) *Attorney, Agent, or Firm* — Lindauer Law, PLLC

(57) ABSTRACT

An autonomous mobile device (AMD) may be used in an environment as a communication endpoint for voice or video communications. An incoming request for communication may initiate a process in which the AMD finds a user within the environment. Information obtained from sensors onboard the AMD or in the environment may be used to determine the whereabouts of the user. If an existing communication endpoint is not available to the user or cannot support a requested communication modality, the AMD may travel to permitted areas within the environment to find the user, while avoiding areas designated as private. Once found, communication may be established with the user. If the incoming request expires, the AMD may present information indicative of the request to the user.

20 Claims, 14 Drawing Sheets

(56) References Cited

U.S. PATENT DOCUMENTS

| | | | |
|---|---|---|---|
| 2009/0022294 A1* | 1/2009 | Goldstein | H04M 1/6066 379/207.02 |
| 2009/0298482 A1* | 12/2009 | Yen | H04M 1/6075 455/414.2 |
| 2010/0076600 A1* | 3/2010 | Cross | H04N 7/15 700/259 |
| 2010/0279670 A1* | 11/2010 | Ghai | H04L 65/1083 455/414.3 |
| 2010/0329441 A1* | 12/2010 | Smith | H04M 3/42391 379/207.11 |
| 2011/0288684 A1* | 11/2011 | Farlow | G05D 1/0038 700/264 |
| 2012/0281092 A1* | 11/2012 | Olivier | H04L 65/4092 348/148 |
| 2013/0035790 A1* | 2/2013 | Olivier, III | G05D 1/0246 901/1 |
| 2014/0116469 A1* | 5/2014 | Kim | G05D 1/0022 134/18 |
| 2015/0312742 A1* | 10/2015 | Choi | H04W 4/80 455/404.2 |
| 2016/0057285 A1* | 2/2016 | Lee | H04M 3/42153 455/417 |
| 2016/0077710 A1* | 3/2016 | Lewis | G06F 3/011 715/716 |
| 2016/0164658 A1* | 6/2016 | Fraser | H04W 76/30 370/280 |
| 2017/0155703 A1* | 6/2017 | Hao | H04W 4/70 |
| 2017/0168486 A1* | 6/2017 | Tommy | B25J 9/1615 |
| 2017/0180532 A1* | 6/2017 | Yang | H04M 1/72519 |
| 2017/0203439 A1* | 7/2017 | Shin | G05D 1/0219 |
| 2017/0251138 A1* | 8/2017 | Yoon | H04N 5/23206 |
| 2017/0358201 A1* | 12/2017 | Govers | G08B 29/188 |
| 2018/0229372 A1* | 8/2018 | Breazeal | B25J 11/001 |
| 2018/0270884 A1* | 9/2018 | Fraser | H04W 28/26 |
| 2018/0322749 A1* | 11/2018 | Kempel | G05D 1/0094 |
| 2019/0015758 A1* | 1/2019 | Higuchi | A63H 33/005 |
| 2019/0015993 A1* | 1/2019 | Kunitake | B25J 5/007 |
| 2019/0146518 A1* | 5/2019 | Deng | B25J 19/026 382/118 |
| 2019/0235832 A1* | 8/2019 | Pallakoff | G06F 3/0482 |
| 2019/0245851 A1* | 8/2019 | Whaley | H04W 4/80 |
| 2020/0180903 A1* | 6/2020 | Aberg | B66B 1/2408 |

* cited by examiner

SYSTEM FOR AUTONOMOUS MOBILE DEVICE ASSISTED COMMUNICATION

BACKGROUND

Every day a user attends to a variety of tasks both personal and work related. These may include helping in the care of others such as children or the elderly, taking care of a home, staying in contact with others, communicating with others, and so forth. Devices may help the user perform these tasks better.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
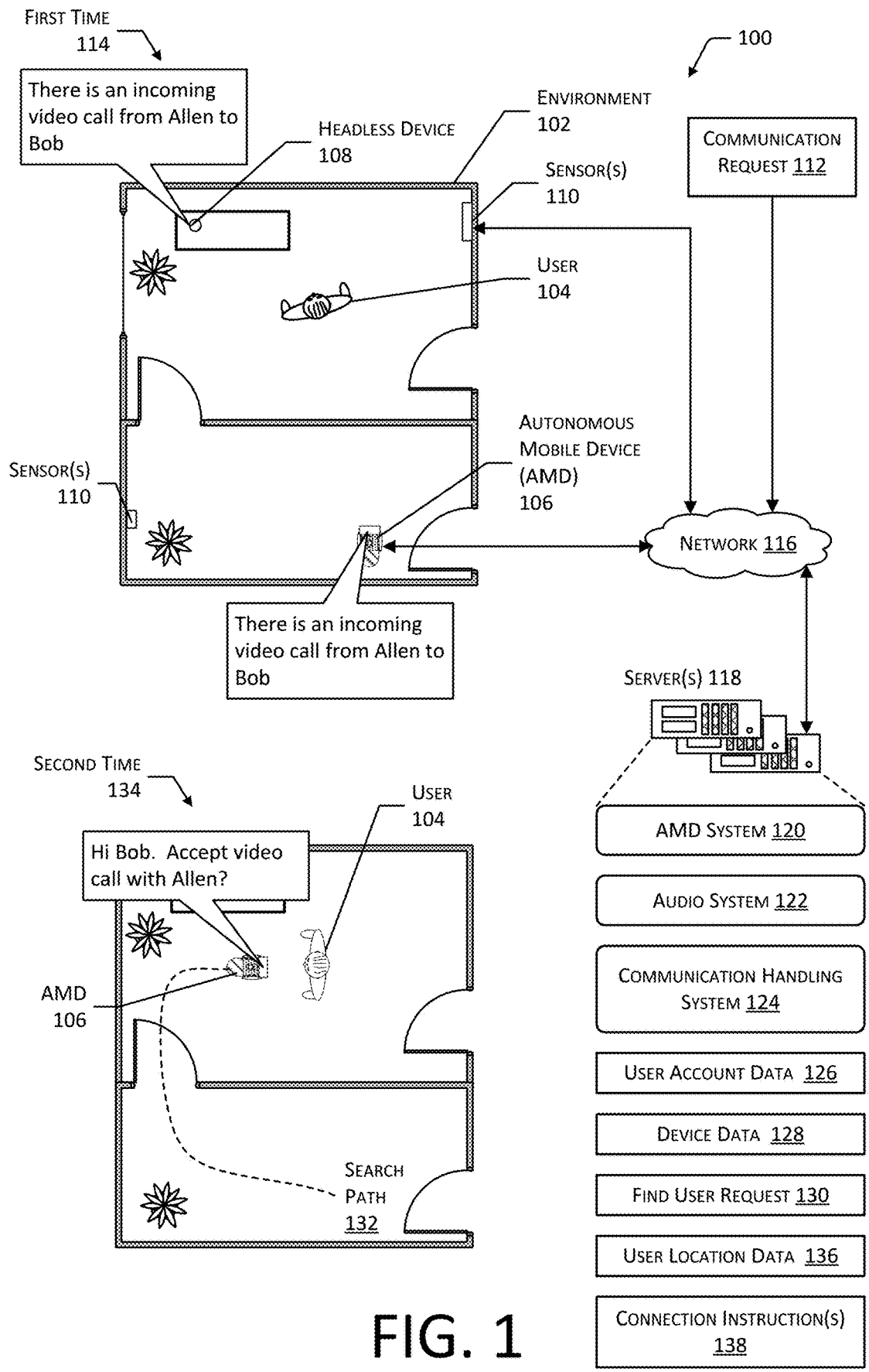
FIG. 1 illustrates a view of a system in which an autonomous mobile device (AMD) facilitates communication, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A user's environment, such as their home, office, and so forth, may have various devices to help them complete a wide variety of different tasks. The devices may include stationary or moveable devices that are located in different rooms. Stationary devices may include voice enabled devices, smart televisions, home automation devices, and so forth. Moveable devices may include autonomous mobile devices (AMDs) that are capable of moving themselves. The tasks may include staying in communication with other people, performing household chores, and so forth.

The devices may act as communication endpoints, allowing the user to communicate using one or more different communication modalities. For example, one communication modality may be audio only, such as a telephone call. Another communication modality may be a video call in which audio and video data is provided. In other situations, other modalities may be used, such as instant messaging.

The modalities available may be constrained by the capabilities of the device. For example, some devices may be "headless" in that they do not have a display or other mechanism to present images. A headless device, such as a voice enabled device, may include speakers and a microphone that allow it to support audio-only communication while being unable to support a video call because of a lack of the display.

The AMD may include sensors and output devices that allow it to act as a communication endpoint for various communication modalities. For example, the AMD may include a microphone and speaker, allowing it to operate as a communication endpoint for voice only communication. In another example, the AMD may further include a camera and display, allowing it to operate as a communication endpoint for video communication.

A communication request may be made to establish communication between a caller and a user. For example, Allen (the caller) may try to place a video call to Bob (the user) at his home. A communication handling system receives the communication request and tries to determine a communication endpoint that is associated with Bob that is in Bob's home. The communication handling system may check to see what devices are associated with Bob's user account and determine the location and capabilities of those devices. Continuing the example, the communication handling system determines that Bob has an AMD that can act as an endpoint for a video call.

The communication handling system may send an instruction to the AMD to provide an announcement, such as a "ring" prompt to notify Bob of the incoming call. If Bob is not near the AMD, the system may direct the AMD to search for and find Bob.

The AMD may then search for Bob within the home, travelling from room to room trying to find him. The AMD's path is constrained such that the AMD is prohibited from entering areas marked as impermissible for entry. For example, the AMD may be disallowed from entering a bathroom. When the AMD finally finds Bob, a prompt may be presented to him asking if he would like to accept the communication request and begin the video call. If Bob replies in the affirmative, communication is established between Allen and Bob using the video call communication modality, with the AMD acting as an endpoint.

The communication request may be discontinued or may time out before the user is found. In this situation, the AMD may continue to search for the user associated that is designated by the communication request. Once found, the AMD may present information about the missed communication request. For example, the AMD may announce to the user "You missed a video call from Allen. Would you like to call him back?" An audio system may process the response, and if in the affirmative, a communication request may be sent to a system or device associated with Allen.

The system also supports other functionalities. Continuing the example above, if Bob was in a room with a headless device, he may have been presented with the option of initiating voice-only communication to begin his communication with Allen. Meanwhile, the AMD would be travelling through the house to find Bob. Once found, the communication may transition from the voice-only communication modality to a video communication modality, using the AMD which has now arrived near Bob as the communication endpoint.

By implementing the system and associated techniques as described herein, users are better able to more easily utilize an AMD as a communication endpoint. Instead of the inconvenience of having a user go to a particular room where there is a particular device that supports a desired communication modality, the device in the form of the AMD is able to come to the user. This provides significant benefits to those users with mobility limitations, or who may be engaged in another task which cannot be safely or easily left to answer an incoming call.

Illustrative System

FIG. 1 illustrates a view 100 of a physical environment 102 in which a user 104 may be present. An AMD 106 may be present at the physical environment 102. The AMD 106 may include one or more computing devices, sensors, and a drive system. The computing devices may gather sensor data using the sensors and use this sensor data to control a drive system that moves the AMD 106 within the physical environment 102. For example, the AMD 106 may have a drive system comprising wheels that are driven by a motor.

The physical environment 102 may include a residence, office, warehouse, factory, medical facility, and so forth. Within the physical environment 102 there may be various rooms. In addition to the AMD 106, the environment 102 may include one or more other devices, such as headless devices 108. For example, the headless device 108 may comprise a voice enabled device that includes a microphone and speaker but does not include a display.

The environment 102 may include one or more sensors 110. For example, the sensors 110 may include security system elements such as cameras, motion sensors, keycard readers, and so forth. The sensors 110 may include a wireless access point, radio receiver, radio frequency identification (RFID) device, near field communication (NFC) device, and so forth. The sensors 110 may also include information about operation of a home or facility automation system, such as data indicative of lights being turned on, changes to environmental controls, and so forth. In some implementations, the sensors 110 may be incorporated into one or more of the devices, such as the headless device 108, the AMD 106, or other devices in the environment 102.

A communication request 112 is generated. For example, a caller may initiate a request for a video call with the user 104 using a caller device. The video call may be unidirectional or bidirectional. For example, a video call that provides video from a first endpoint to a second endpoint and no video from the second endpoint to the first endpoint may be unidirectional. In another example, a bidirectional video call may provide video from each endpoint to the other endpoint(s).

The communication request 112 may include information such as a source identifier, destination identifier, type of communication modality requested, and so forth. For example, the communication request 112 may comprise a session initiation protocol (SIP) request that is originated responsive to input made by a caller at an endpoint device. The source identifier may comprise information such as a name of the caller, an originating telephone number, a network address of the caller, username of the caller, and so forth. Likewise, a destination identifier may include such information about the user 104 who is the intended recipient of the communication. The type of communication modality may indicate if the requested communication is a voice call, video call, text message, virtual reality, and so forth. The establishment of a communication session between the devices is described in more detail below with regard to FIGS. 11-13B.

At a first time 114 the communication request 112 is transferred via a network 116 to one or more servers 118. For example, the network 116 may comprise one or more of a public network, such as the internet, a private network, or a combination thereof.

The servers 118 may comprise one or more computing devices located at one or more locations. The servers 118 may execute one or more systems that provide one or more services. For example, the servers 118 may execute an AMD system 120, an audio system 122, and a communication handling system 124.

The AMD system 120 provides various services to support operation of the AMD 106. For example, the AMD system 120 may include services to process sensor data to assist in the generation of an occupancy map that indicates the location of objects in the environment 102. In some implementations, at least a portion of the services may execute locally on the AMD 106.

The audio system 122 provides various services that provide a verbal user interface to different functions and other systems. The audio system 122 may be accessed using various devices, including the AMD 106, headless devices 108, sensors 110, and so forth. For example, the audio system 122 may be configured to process audio data of human speech obtained by a microphone. The audio data is processed to generate data indicative of what the speech means. The audio system 122 may also implement various functions or speechlets that provide specific functionality, such as retrieving information or interacting with other services. The audio system 122 may also provide audible output, such as synthesized human speech, music, and so forth. The audio system 122 may operate in conjunction with the AMD system 120. For example, audio data obtained using a microphone on the AMD 106 may be processed by the audio system 122, and the output then provided to the AMD system 120. Likewise, the AMD system 120 may provide data to the audio system 122 to provide output to the user 104. As described below, the audio system 122 may operate in conjunction with the communication handling system 124. The audio system 122 is discussed in more detail with regard to FIG. 5.

The communication handling system 124 may process the communication request 112. For example, the communication handling system 124 may process the communication request 112 to determine the origin of the request, the destination of the request, and the type of communication modality requested. Continuing the example, the communication request 112 may indicate that Allen is requesting a video call with Bob.

The communication handling system 124 may access various information to process the communication request 112. User account data 126 may be accessed that provides information about which devices are associated with Bob's account. Device data 128 provides information about those devices, such as what communication modalities they support, where the devices are physically located, and so forth.

Responsive to the communication request 112, the communication handling system 124 may try to use the devices associated with the user's 104 account to establish the desired communication. For example, the communication handling system 124 may use output devices on the AMD 106 and headless devices 108 to announce the incoming communication request 112. Continuing the example, the AMD 106 and the headless device 108 may each use a speaker to present synthesized speech generated by the audio system 122 to announce, "there is an incoming video call from Allen to Bob".

If a device that supports the requested communication modality is available to the user 104, such as within a threshold distance or in the same room, the user 104 may accept the communication request 112 and communication is established. For example, if the room in which the user 104 occupies includes a network enabled device with a display, camera, and speakers, the video call may proceed using that device as the communication endpoint.

However, the requested communication modality may not be supported by the available device. At illustrated, at the first time 114 the user 104 is in a room that only contains a headless device 108. The headless device 108, lacking a display, is not able to support the requested communication modality of a video call as requested by the communication request 112.

In one implementation the user 104 may respond to the announcement and accept the incoming call using the headless device 108 to provide an alternative communication modality. For example, instead of a video call, the communication handling system 124 may establish a voice call between Allen and Bob.

Meanwhile, the communication handling system 124 has determined that the user 104 is in an environment 102 in which an AMD 106 is available. The communication handling system 124 may request information from the AMD system 120 and determine that the AMD 106 is not otherwise occupied with another user. For example, if the AMD 106 is current in use by another user 104, the AMD 106 may be deemed unavailable. If the AMD 106 is deemed to be available for use, the communication handling system 124 may then issue a find user request 130. The find user request 130 may be processed by one or more of the AMD 106 or the AMD system 120 to have the AMD 106 seek out the user 104 within the environment.

The find user request 130 results in the AMD 106 following a search path 132 through the environment 102. For example, the find user request 130 may comprise one or more instructions that direct the AMD 106 to move along the search path 132. The search path 132 for the user 104 may be guided using various information available to the servers 118. For example, if the user 104 accepted the communication request 112 using the headless device 108, the user 104 is known to be proximate to the headless device 108. The location of the headless device 108 may be retrieved and the AMD 106 may be directed along a search path 132 that includes that location. In another example, sensor data obtained from the devices in the environment 102 such as the AMD 106, headless devices 108, sensors 110, and so forth may be used to determine a location of the user. For example, motion sensors may provide information about which rooms in the environment 102 are occupied. The find user request 130 may then be designated to have the AMD 106 search these rooms. In another example, historical location data, such as where the user 104 has been at various times in the past, may be used to predict the location of the user 104. The find user request 130 sent to the AMD 106 may include this information, facilitating the AMD 106 searching these predicted locations. In other implementations, other techniques may be used to find the user 104.

The find user request 130 may include, or operate in conjunction with, information about impermissible areas within the environment 102. Constrains may be placed on the areas in the environment 102 that may be searched by the AMD 106. For example, areas designated as impermissible, such as bathrooms and bedrooms, may be excluded from the search. In some implementations, the AMD 106 may be configured to approach a boundary of the impermissible area and provide an output. For example, the bedroom may be designated as impermissible, but the AMD 106 may be able to approach the door to the bedroom and play an announcement or present other indicia.

As the AMD 106 encounters users 104 in the environment 102 it may attempt to identify those users 104. For example, the users 104 may be identified based on the sound of their voice, their appearance, by providing an identification code or password to the AMD 106, based on data from a device or token that they have in their possession, and so forth. In some implementations the audio system 122 may provide information indicative of the identity of a person based on their speech. In another example, the AMD system 120 may provide information indicative of the identity of a person based on their facial features.

At a second time 134 the user 104 has been found by the AMD 106. User location data 136 may be determined when a user 104 is found. The user location data 136 may comprise information about the identity of the user 104 and their location within the environment 102.

The user location data 136 may be used by the communication handling system 124 to determine whether to establish communication and issue corresponding connection instructions 138. If the communication request 112 is to a specific user 104, such as "Bob", the communication handling system 124 may be configured to limit the establishment of communication to the discovery of the specified user 104. For example, responsive to user location data 136 indicating that the AMD 106 has found the user 104, the communication handling system 124 may generate connection instructions 138 that are used to establish communication between the caller device of the caller and the endpoint device associated with the user 104. Continuing the example, as illustrated here, Bob uses the AMD 106 to begin his video call with Allen.

If the communication request 112 is not specific to the user 104, but rather is directed to anyone in the environment 102, the communication handling system 124 may issue connection instructions 138 to establish communication with the first user 104 who is found during the search.

In some implementations, the communication handling system 124 may be configured to limit establishment of communications based on other criteria. For example, a young child may be categorized as a user 104 with privileges to accept a communication request 112 only from a specified whitelist of callers.

When the communication request 112 is to a specific user 104, the AMD 106 may be configured to ask other users 104 it encounters, or otherwise receive input from the other users 104, as to the whereabouts of the specific user 104. For example, while traveling along the search path 132, the AMD 106 may encounter Charlie in the environment 102 and use synthesized speech to ask "I have a call for Bob. Do you know where he is?" Charlie's response may be processed by the audio system 122, and the AMD 106 may alter the search path 132 to try the location suggested by Charlie.

Once the AMD 106 has found the user 104, the communication handling system 124 may issue connection instructions 138. In one implementation, the connection instructions 138 may comprise instructions to accept a SIP request and establish communication using the AMD 106. The establishment of communication is described below with regard to FIGS. 11-13B. In another implementation, the connection instructions 138 may include the termination of an existing communication and establishing another communication. For example, the user 104 may have accepted the communication request 112 using a voice-only communication modality with the headless device 108 while the AMD 106 was in route to the location of the user 104. Once the AMD 106 has arrived at the user's 104 location, the communication using the voice-only communication modality may be terminated, and a video call communication modality may be established with the original caller using the AMD 106 as a communication endpoint. In some implementations the connection instructions 138 may comprise a communication request that is sent to the caller device that originated the communication request 112.

In other implementations, responsive to the communication request 112, in the absence of the user 104 accepting communication using an alternative communication modality or using another device as a communication endpoint, the communication handling system 124 may issue the find user request 130, dispatching the AMD 106 to the user 104. In the event the communication request 112 times out or expires before the user 104 is found, or the caller device canceled the communication request 112, the AMD 106 may continue to find the user 104. Once found, the AMD 106 may present to the user 104 information about the missed communication request 112.

The communication handling system 124 is configured to facilitate the establishment of communication between two or more parties. This disclosure describes two-party communication, such as a caller and the user 104, by way of illustration and not necessarily as a limitation. It is understood that the systems and techniques described above may be used for communications that involve any number of participants.

Figure 2:
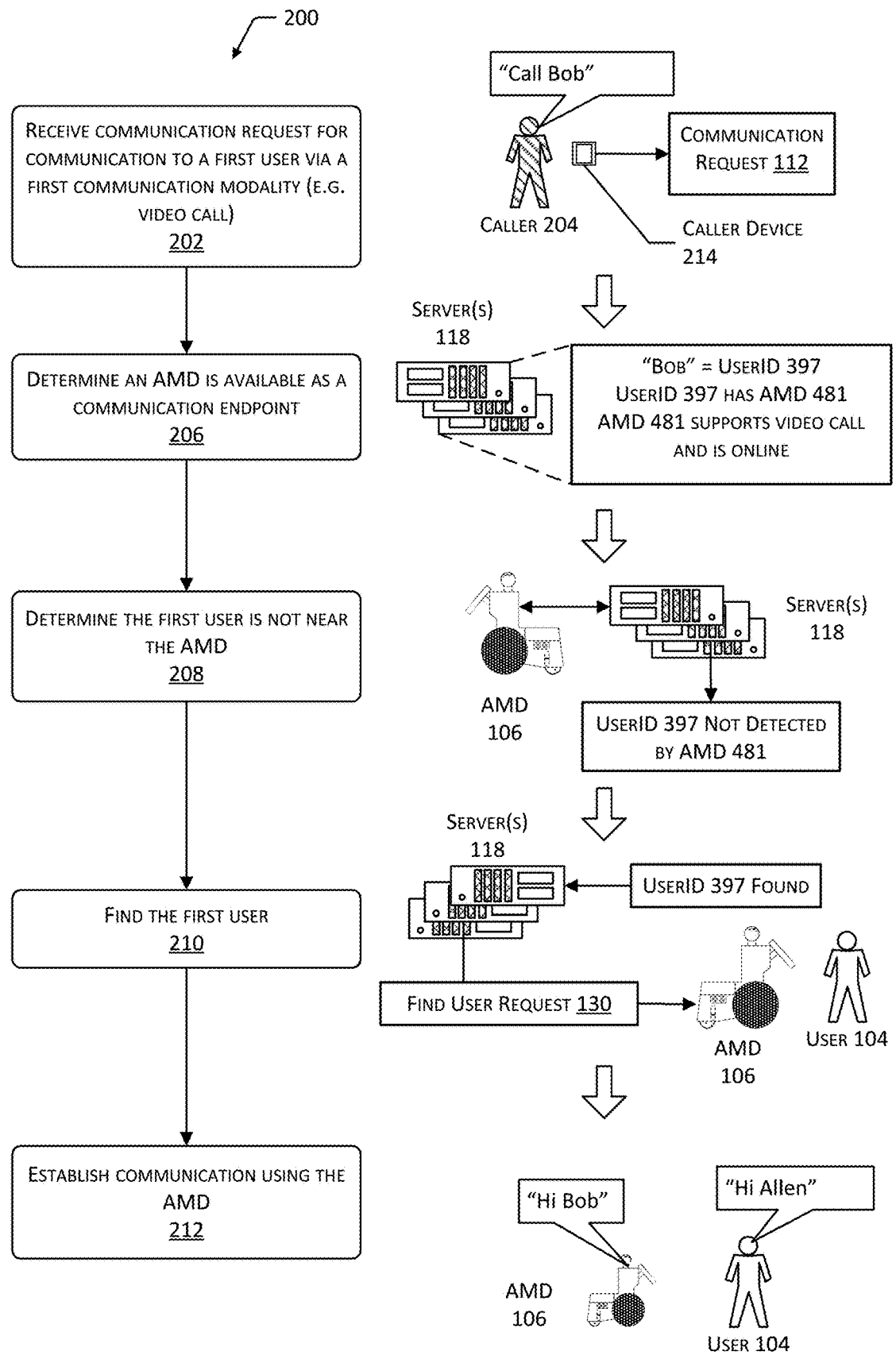
FIG. 2 illustrates a scenario in which an AMD responds to a communication request for communication with a first user by finding the first user in an environment, according to some implementations.

FIG. 2 illustrates a scenario 200 in which an AMD 106 responds to a communication request 112 for communication with a first user 104 by finding the first user 104 in the environment 102, according to some implementations.

At 202 a communication request 112 is received. The communication request 112 may be received via the network 116 at the communication handling system 124. The communication request 112 may include information indicative of, or associated with, the first user 104 and may include information indicative of a first communication modality. For example, a caller 204 "Allen" may use a communication endpoint or caller device 214, such as tablet computer, to generate or cause to be generated a communication request 112. The first communication modality may be a voice call, video call, text message, and so forth.

At 206 a determination is made that an AMD 106 is available as a communication endpoint. For example, the communication handling system 124 on the servers 118 may access the user account data 126 and determine which devices are associated with the user account of the first user 104. The AMD 106 may be listed as being associated with Bob's user account. For example, this may be due to a previous affiliation, such as Bob registering the AMD 106 to his account, or may be due to location. Continuing the example, if Bob is known to be at a particular location, and an AMD 106 is at that location, the AMD 106 may be deemed to be associated with Bob's user account. The AMD 106 may be deemed to be available when it supports one or more communication modalities, is in communication with the servers 118, and is not currently engaged in a task or is engaged in a task that has been previously designated as being allowed to be interrupted. For example, the AMD 106 may be deemed unavailable if a second user 104 is interacting with it.

At 208 the first user 104 is determined to not be near the AMD 106. For example, one or more of the sensors of the AMD 106 may be used to determine the presence of a person. Once detected, the user 104 may be identified. For example, the user 104 may be identified using facial recognition, voice recognition, detection of a token such as an RFID tag carried by the user 104, or other techniques. If the first user 104 is not identified, then they may be deemed to not be near the AMD 106. In some implementations at least a portion of the sensor data may be sent to the servers 118 for processing to determine the identity of the user 104. For example, the sensor data comprising image data obtained by cameras on the AMD 106 may be sent to the AMD system 120 that determines identity of a user 104 based at least in part on the image data. In another implementation current user location data 136 of the user 104 may be checked against a current location of the AMD 106.

In other implementations other techniques may be used. For example, the first user 104 may be determined to be beyond a first threshold distance from the AMD 106. In another example, an absence of any users, whether identified or not, that are beyond a second threshold distance from the AMD 106 may be determined.

At 210 the AMD 106 tries to find the first user 104. For example, the servers 118 may send a find user request 130 to the AMD 106, the AMD system 120, or both. The AMD 106 may then begin executing a search path 132 to try and locate the first user 104. In this scenario, the AMD 106 finds the first user 104 and sends data indicative of the first user 104 being found to the server 118. In some implementations the data may be indicative of the location of the first user 104. In some implementations the AMD 106 may provide a user interface, such as an audible prompt, asking the first user 104 to confirm that they wish to accept the requested communication, before establishing a communication session.

At 212 communication is established using the AMD 106. For example, the AMD 106 may present a prompt or user interface for approval of the communication, such as verbally asking or presenting via a touchscreen if the user 104 would like to accept the incoming call. In another example, the user 104 may have previously given permission for automatic acceptance of incoming communication requests 212. The communication handling system 124 may process the communication request 112 and generate connection instructions 138 that direct the AMD 106 to establish communication using the requested communication modality. For example, the communication handling system 124 processes the SIP request from the caller 204 and establishes the connection with the AMD 106.

In implementations where permission for automatic acceptance of a communication request 212 from a particular caller 204 has been previously given, the communication handling system 124 may initiate other behaviors. For example, until the user 104 explicitly authorizes, video data sent from the AMD 106 may be obscured or filtered to remove details. Continuing the example, while bidirectional audio communication may be established automatically, a "blur", "frosted", pixelated, or other visual effect or algorithm may be applied to at least a portion of outbound video data obtained by the camera onboard to AMD 106 until the user 104 indicates acceptance of the video call. For example, a Gaussian blur algorithm may be used to process the video data to obscure details in the resulting output. In some implementations one or more of audio being output by the AMD 106, such as from one or more speakers, or audio being detected by the AMD 106, such as from one or more microphones, may be muted. For example, the microphones on the AMD 106 may be muted, preventing audio detected by them from being sent to the caller until the user 104 provides explicit authorization.

In another implementation, automatic acceptance may be configured to establish one or more of audio or video communication but the AMD 106 may not be dispatched to find the user 106. In this implementation, at least a portion of the automatically accepted communication may be suspended or terminated before the AMD 106 responds to a find user request 130 and begins moving. For example, video communication may be terminated while audio communication remains.

Figure 3:
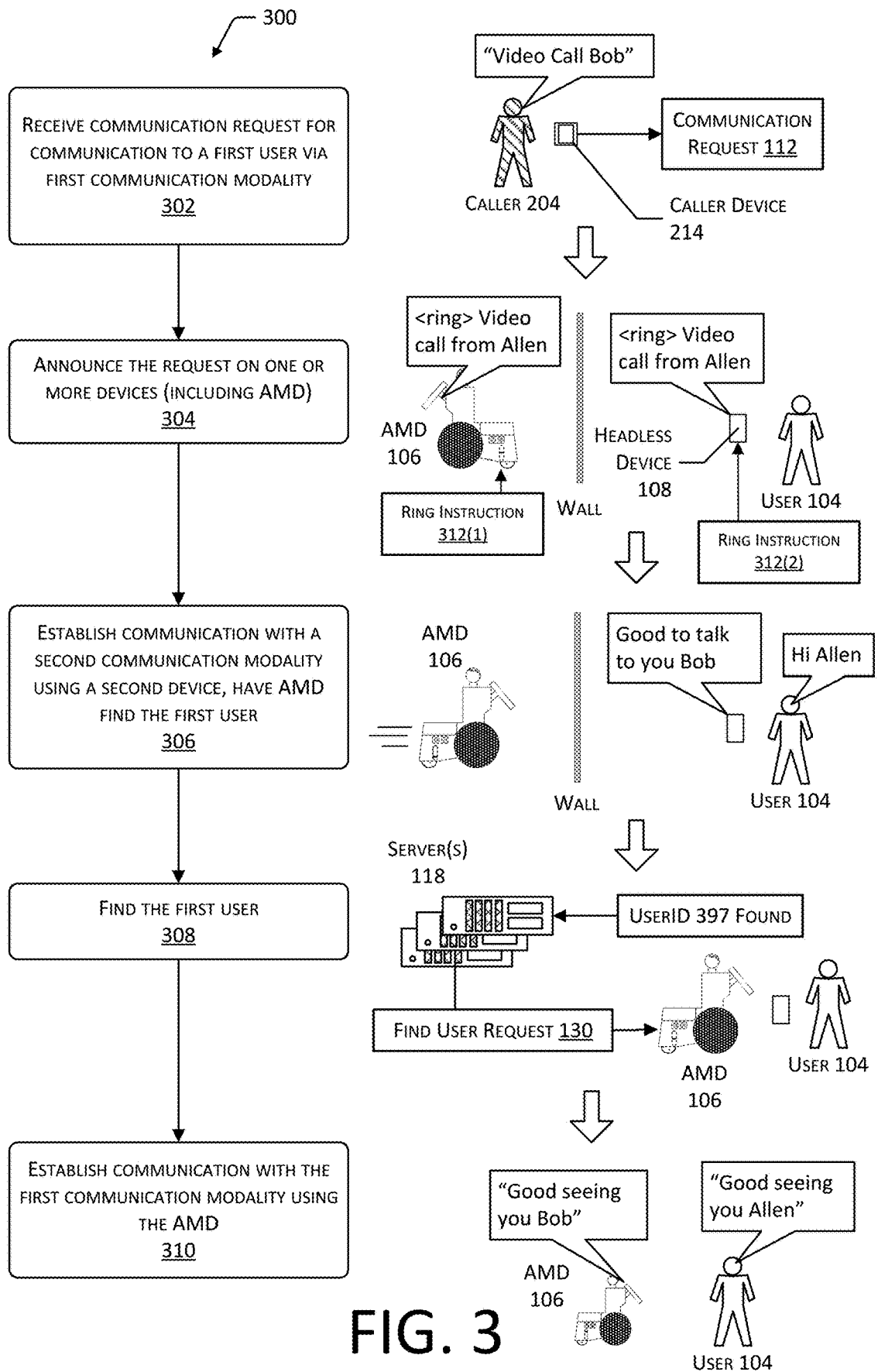
FIG. 3 illustrates a scenario in which an AMD responds to a communication request by establishing a communication session with the user using a first communication modality, finds the user in an environment, and transitions to using the AMD to communicate using a second communication modality, according to some implementations.

FIG. 3 illustrates a scenario 300 in which an AMD 106 responds to a communication request 112 by establishing a communication session with the first user 104 using a first communication modality, finds the first user 104 in the environment 102, and transitions to using the AMD 106 to communicate using a second communication modality, according to some implementations.

At 302 a communication request 112 is received for communication to the first user 104 via a first communication modality. For example, the caller 204 Allen may be using a caller device 214 to try and place a video call with Bob.

At 304 information about the communication request 112 is announced using one or more devices in the environment 102. For example, a first ring instruction 312(1) may be sent to the AMD 106 and a second ring instructions 312(2) may be sent to the headless device 108. These devices may include those which include microphones, speakers, cameras, displays, or other input/output devices. For example, the headless device 108 may use a speaker to provide an audible announcement comprising a ringing sound and a synthesized voice saying "Video call from Allen." The AMD 106 may process the first ring instruction 312(1) and provide this audible announcement and may also present information on a display screen. In other implementations other types of announcements may be used. For example, a device with a display but no camera may provide visual output, a haptic output may be presented, a light may illuminate, and so forth. Continuing the example, the headless device 108 may process the second ring instruction 312(2) and provide an audible announcement. The ring instructions 312 may be provided by the communication handling system 124, the AMD system 120, or other systems.

As shown in this scenario, the AMD 106 is in a different room from the user 104. However, the user 104 is near another device that may be used as a communication endpoint, such as the headless device 108. The headless device 108 may be a voice activated device which includes a microphone and speaker.

At 306 communication is established using a second communication modality using a second device. For example, the user 104 may speak aloud "answer incoming call". The headless device 108 may produce audio data representative of the speech. The audio data may then be processed by the audio system 122 to determine the intent of "accept call". The communication handling system 124 may access the device data 128 associated with the second device, and determine the inability to handle the first communication modality of a video call. As a result, the system may then establish communication using a second communication modality of an audio call. As a result, communication, albeit with a different communication modality than requested by the caller 204, begins. In another example, the user 104 may establish communication with a device that supports a unidirectional video call. Continuing the example, the user 104 may accept the communication request using a television that is able to present the video provided by the caller's 204 device, but the television does not include a camera.

Meanwhile, the AMD 106 may be sent to find the user 104. In some situations, the location of the user 104 may be known based on the use of the second device. For example, if the headless device 108 is known to be in the living room, and the user 104 answered the call using the headless device 108, then the user 104 may be determined to be in the living room. The AMD 106 may be given a find user request 130 that includes directions to move to the living room while looking for the user. The find user request 130 may be updated as new information is received. For example, if the user 104 moves to the kitchen, the find user request 130 may be updated to direct the AMD 106 to the kitchen.

If the AMD 106 is determined to be interacting with a second user 104, the AMD 106 may delay the search until after the second user 104 is through using the AMD 106. For example, the interaction may include the second user 104 requesting the AMD 106 to perform a task. When the task is complete, the AMD 106 may then begin the search. In one implementation the AMD 106 may maintain a task queue that is indicative of tasks current in progress, that are scheduled, and so forth. The task queue may be queried to determine if the AMD 106 is available to perform the search. The sending of the find user request 130 may be responsive to a determination that the task queue for the AMD 106 indicates the AMD 106 is not currently engaged in a task.

At 308 the first user 104 is found. As described above, the AMD 106 finds the first user 104 and sends data indicative of the user 104 being found to the server 118. The user 104 may then be presented with the option to transfer communication to the AMD 106. For example, the AMD 106 may present a prompt or user interface, such as verbally asking or presenting via a touchscreen, if the user 104 would like to transfer the communication to the AMD 106.

At 310 communication is established using the first communication modality, using the AMD 106 as a communication endpoint. For example, the AMD 106 may use an output device such as a speaker, display, and so forth, to present a prompt. An input device on the AMD 106 may produce input data responsive to input from the user 104. Responsive to the input data, the communication handling system 124 may issue a command to terminate the communication using the second communication modality and initiate communication with the caller 204 using the first communication modality. The first user 104 may now carry on a video call with the caller 204. The input to transfer the communication may be received via the AMD 106, the headless device 108, or other device.

Figure 4:
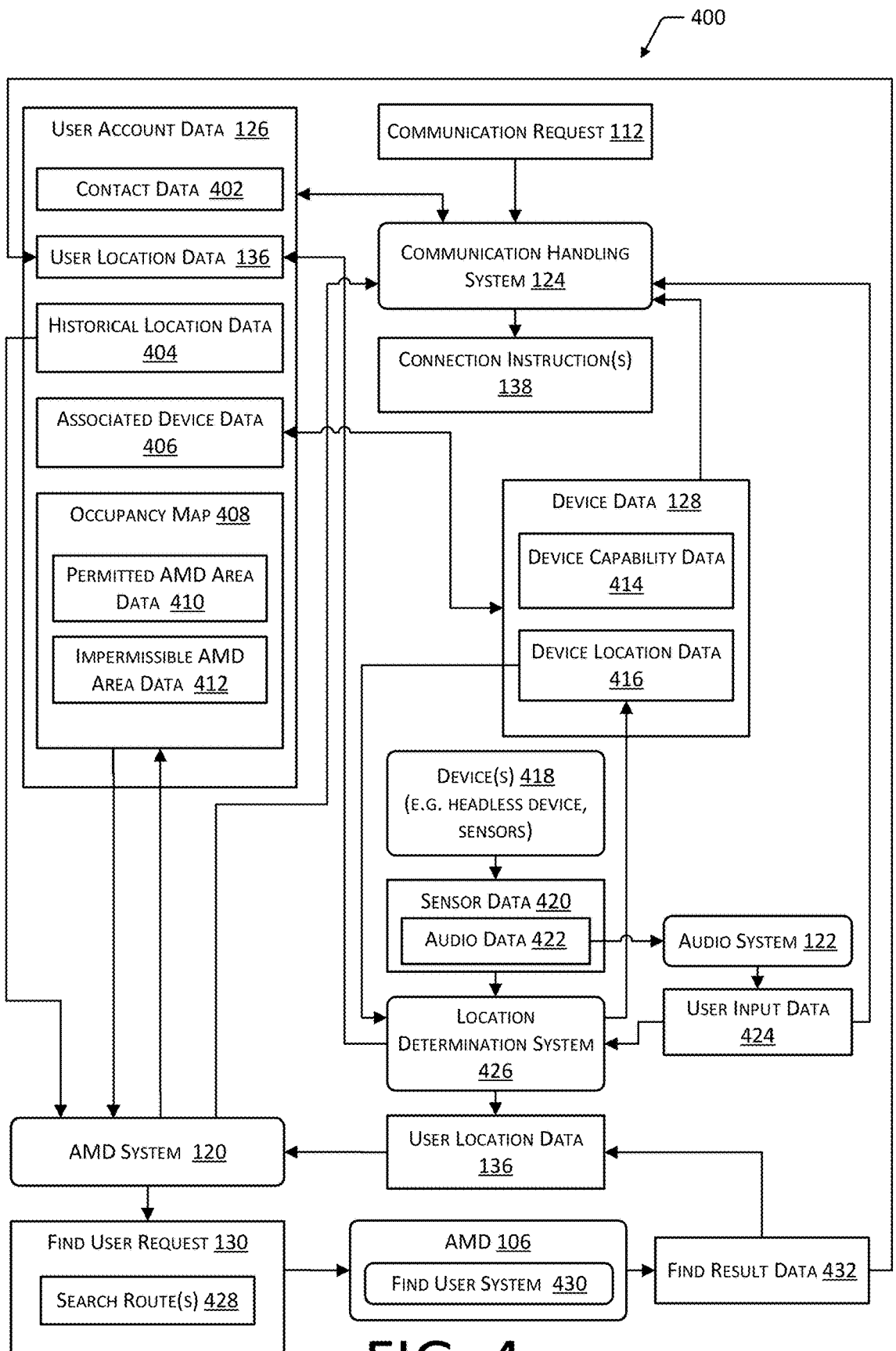
FIG. 4 is a block diagram of the system for AMD assisted communication, according to some implementations.

FIG. 4 is a block diagram 400 of the system for AMD assisted communication, according to some implementations. As described above, a communication request 112 is processed by a communication handling system 124. The communication handling system 124 may generate connection instructions 138 that direct one or more devices in the environment 102 to act as communication endpoints.

The communication handling system 124 may receive input information such as user account data 126. The user account data 126 may include contact data 402, the user location data 136, historical location data 404, associated device data 406, and an occupancy map 408.

The contact data 402 may comprise information about how to establish communication with specified parties, or parties who may try to communicate with the user 104. In one implementation, the contact data 402 may include a contact identifier, a user name, a network address, a telephone number, a contact name, and so forth. For example, the user 104 "Bob" may have contact data 402 that includes "Allen Poe" and indicates his username is "AllenP@examples.com", his telephone number is "555-555-1212", and so forth.

The user location data 136 provides information as to the location of the user 104. In some implementations, the location may be designated with respect to the environment 102. For example, the user location data 136 may indicate "home:living_room" or "work:office". In other implementations the location may be designated with respect to an external reference, such as latitude and longitude. The user location data 136 may be determined based on data from sensors 110 in the environment 102, from information obtained by the devices in communication with the servers 118, data from a device carried by the user 104 such as a smart phone or wearable device, and so forth. For example, the user location data 136 may indicate the last known position of the user 104. In some implementations the user location data 136 data may include a timestamp indicative of when the location was determined.

The servers 118 may generate the historical location data 404 that is associated with a particular user 104 and their user account. The historical location data 404 is indicative of where the user 104 has previously been. In some implementations the historical location data 404 may be generated based at least in part on the user location data 136 accumulated over some period of time. The historical location data 404 may comprise data that indicates a likelihood that the user 104 is present at a particular location within the environment 102 at a given time of day. For example, the historical location data 404 may indicate that between the hours of 18:00 to 19:00 the user 104 has an 87% probability of being in the location designated as "home:dining_room".

The associated device data 406 indicates the devices that are associated with the user account. The associated device data 406 may include a list of the headless devices 108, home automation devices, AMDs 106, or other devices that are registered to the user account of the first user 104. The associated device data 406 may also include a list of the devices that are present in the environment 102. For example, if a second user 104 permits, when the first user 104 visits the second user's 104 home, while the first user 104 is visiting at least some of those devices may be associated with the first user 104.

The occupancy map 408 may indicate the location of objects in the environment 102 such as furniture, walls, doorways, names associated with particular rooms or areas, and so forth. The occupancy map 408 may include permitted AMD area data 410 and impermissible AMD area data 412. The permitted AMD area data 410 indicates those areas on the occupancy map 408 that the AMD 106 is permitted to enter. The impermissible AMD area data 412 indicates those areas on the occupancy map 408 that the AMD 106 is not permitted to enter. For example, the impermissible AMD area data 412 may indicate a bathroom, bedroom, and so forth. In some implementations, the occupancy map 408 may be associated with device location data 416 described below.

The occupancy map 408 may be determined autonomously or using information obtained by one or more users 104. In one implementation, the AMD 106 may move throughout the environment 102, using sensors such as cameras, LIDAR, ultrasound, and so forth to determine the position and placement of furniture, walls, doorways, and so forth with respect to one another. In some implementations user input may be obtained to label or describe certain rooms or locations within the environment 102, to designate permitted AMD areas, to designated impermissible AMD areas, and so forth. For example, the AMD 106 may follow the user 104 on a tour of the environment 102. During the tour, the user 104 provides input such as saying "this is the living room" while in the living room. The input may be stored, and that location within the environment 102 may be designated as the "living room". Continuing the example, the user 104 may point to the laundry room and say "don't go in there", adding that room to the impermissible AMD area data 412.

The communication handling system 124 may access the device data 128. For example, the associated device data 406 may be used to retrieve information about the devices associated with the user 104. The device data 128 may include one or more of device capability data 414 or device location data 416. The device capability data 414 provides information indicative of what the device is able to do. For example, the device capability data 414 may indicate what types of input device, output devices, and so forth are available. In some implementations the device capability data 414 may indicate the types of communication modalities that are supported by the device. The device location data 416 provides information as to the location of the device in the environment 102. For example, the device location data 416 may comprise data indicative of geographic coordinates, coordinates with respect to a designated point in the environment 102, room name, coordinates with respect to an occupancy map, and so forth. The device location data 416 may specify a location with respect to the environment 102, or with respect to an external reference. For example, the device location data 416 may indicate that the headless device 108 is located in the living room while the AMD 106 is located in the sitting room. In some implementations, the device location data 416 may indicate the location of one or more devices with respect to the occupancy map 408. For example, the occupancy map 408 may indicate a room labeled "living room" and the device location data 416 may indicate that the headless device 108 is located within the room designated "living room".

The device data 128 may also include information such as availability. For example, the device data 128 may indicate if a particular device is online, if the device is in use, and so forth.

The devices 418, such as the AMD 106, headless devices 108, sensors 110, and other devices in the environment 102 may generate sensor data 420. For example, the headless device 108 may include a microphone and an analog to digital converter that generates audio data 422 representative of sound in the environment 102. In some implementations, the audio data 422 may be provided to the audio system 122. The audio system 122, as described with regard to FIG. 5, may process the audio data 422 to generate user input data 424. In one example, the audio system 122 may be used to generate synthesized speech that asks, "Would you like to accept the incoming video call from Allen?" The audio system 122 may process the audio data 422 of the user's 104 response to determine that the intent is "yes", and provide this as the user input data 424 to the communication handling system 124. Responsive to this input, the communication handling system 124 may establish the communication.

In another example, the audio data 422 may comprise Charlie saying, "Bob is in the living room". The audio system 122 may generate user input data 424 that indicates that the user "Bob" as associated with a specific user account is physically located at "home:living_room".

The user input data 424 may be provided to the communication handling system 124, a location determination system 426, and so forth. In another example, the user input data 424 described above that is representative of a proposed location of the user 104 "Bob" may be provided by the audio system 122 to the location determination system 426.

The location determination system 426 attempts to determine the user location data 136 based on sensor data 420 obtained from the devices 418. For example, the location determination system 426 may determine the location of the user 104 based on their use of a headless device 108. In another example, the location determination system 426 may determine a location based on other sensors, such as motion sensors in a room, use of room lights, interaction with a smart television, and so forth. In some situations the user location data 136 may include a confidence value that is indicative of a likelihood that the data is accurate. For example, if the location of the user 104 is determined based on their face being recognized using image data obtained from a camera, the likelihood that the data is accurate may be high. In another example, if the location of the user 104 is based on data from motion sensors in the environment 102 tracking the movement of something, the confidence value of the user location data 136 may be relatively low.

In some implementations the communication handling system 124 may request the location determination system 426 to update the user location data 136. For example, the communication handling system 124 may retrieve the user location data 136 from the user account data 126 and determine that the user location data 136 has expired. The communication handling system 124 may then request that the location determination system 426 update the user location data 136.

In another implementation the communication handling system 124 may request that the AMD system 120 generate a find user request 130. Responsive to the find user request 130, the AMD 106 may then search the environment 102 for the user.

As described above, the AMD 106 may be dispatched to the user 104 to operate as a communication endpoint. In some situations, the user location data 136 may be recent and have a high confidence value. The AMD system 120 may issue a find user request 130 that directs the AMD 106 to travel along a search route 428 that ends at the location indicated by the recent user location data 136. For example, it the user 104 is communicating with the caller 204 using the headless device 108 in the living room, the AMD 106 will be issued a find user request 130 with a search route 428 that extends from a current location of the AMD 106 to the living room. As the AMD 106 travels, the onboard sensors are used to detect obstacles, to navigate, detect other users, and to find the user 104 that is being sought. The search route 428 may be updated as additional information associated with the environment 102 is obtained. For example, if a motion sensor indicates that a room that was in an initial version of the search route 428 is no longer occupied, it may be removed from the search route 428.

If the user location data 136 is unavailable, expired, has a confidence value below a threshold, or is otherwise unusable, the AMD system 120 may access other data to develop a search route 428 that includes various locations within the environment 102. For example, the AMD system 120 may access the historical location data 404 in the user account data 126 and determine a search route 428. The search route 428 may attempt to minimize time spent searching based on the occupancy map 408 while prioritizing the locations indicated by the historical location data 404, and given last available user location data 136, if available.

The AMD 106 may implement a find user system 430 that processes the find user request 130 and initiates the search. For example, the find user system 430 may operate in conjunction with an autonomous navigation system to plan and move the AMD 106 through the environment 102. The find user system 430 may generate find result data 432. The find result data 432 may include information such as a location of the user 104 that was found, when the user 104 was found, a confidence value indicative of the identity of the user 104, and so forth. In some implementations the find user system 430 may determine if the AMD 106 is available to perform the search. For example, the find user system 430 may query task queue data that is indicative of tasks of the AMD 106 that are in progress or scheduled to occur. If the find user system 430 determines that the AMD 106 is not engaged in a task, such as interacting with a second user 104, the find user system 430 may initiate the search. The find user system 430 may return to another system data indicative of the delay in performing the search. For example, data indicative of the delay may be sent to the communication handling system 124. The communication handling system 124 may use this data to indicate to the caller that a potential delay in establishing the requested communication session.

The find result data 432 may be used to update the user location data 136, provided to the communication handling system 124, and so forth. For example, the communication handling system 124 may receive the find result data 432 that indicates the AMD 106 has found the user 104 and is proximate to the user 104. Based at least in part on the find result data 432, the communication handling system 124 may attempt to establish communication between the caller 204 and the user 104. This may include using the audio system 122 to ask for approval to accept the communication request 112 and determining the users' 104 assent.

In some situations, the system may not generate a find user request 130. In one implementation, if the user 104 is known to not be in the environment 102 or if the user 104 is known to be within an area that the AMD 106 is not permitted to enter, no find user request 130 may be generated. For example, if the user 104 has been identified in a conference room in Seattle at 14:01 then they are not at their home environment 102 in Austin. In another example, if the user 104 is known to be in their bedroom and the bedroom has been designated as impermissible for AMD 106 entry in the impermissible AMD area data 412, then no find user request 130 will be generated.

Figure 5:
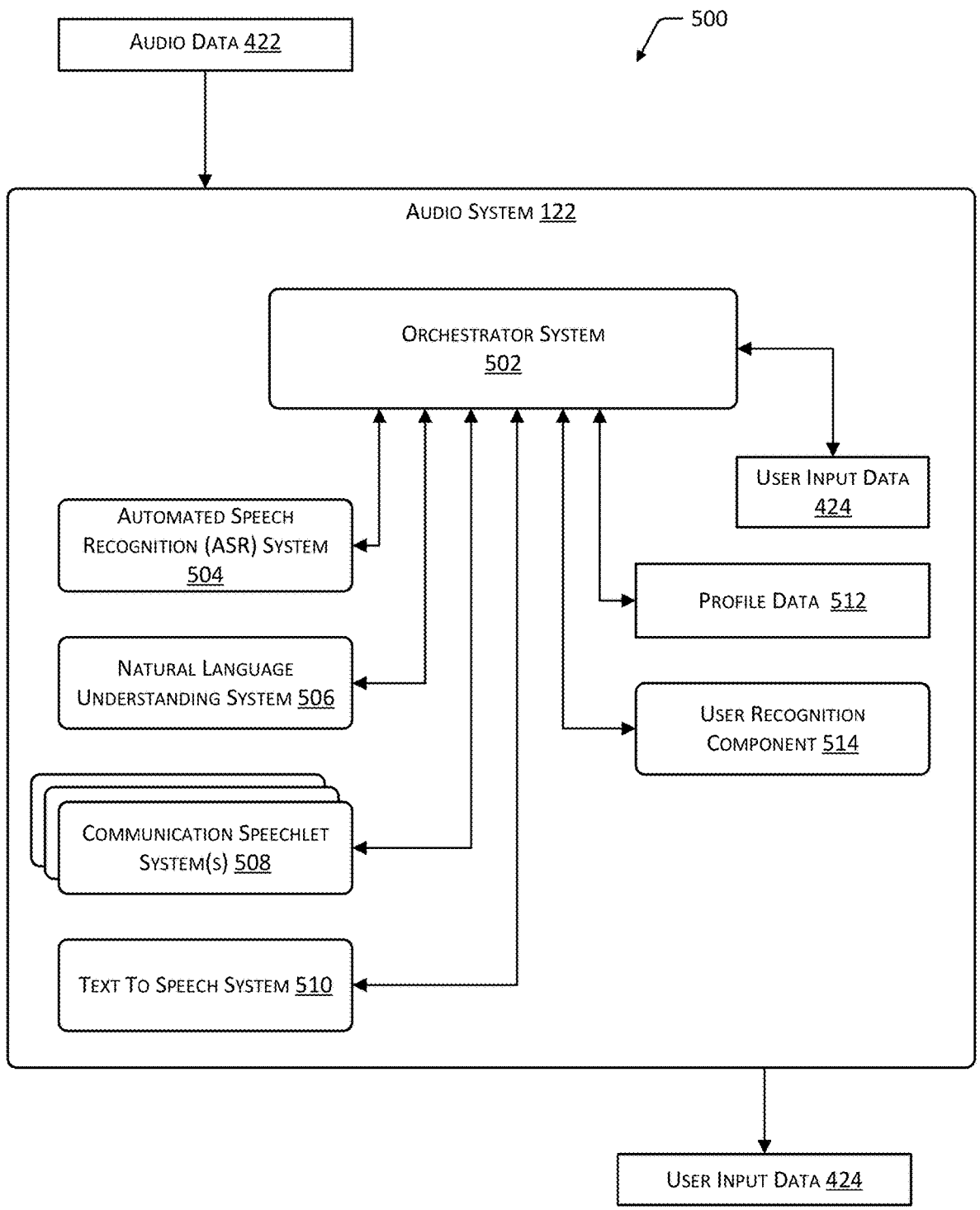
FIG. 5 is a block diagram of an audio system that facilitates processing of audio data such as human speech, according to some implementations.

FIG. 5 is a block diagram 500 of an audio system 122 that facilitates processing of audio data such as human speech, according to some implementations. Upon receipt by the servers(s) 118, the audio data 422 may be sent to an orchestrator system 502. The orchestrator system 502 may include memory and logic that enable the orchestrator system 502 to transmit various pieces and forms of data to various components of the system, as well as perform other operations.

The orchestrator system 502 sends the audio data 422 to an automated speech recognition (ASR) system 504. The ASR system 504 transcribes the audio data 422 into text data. The text data output by the ASR system 504 represents one or more than one (e.g., in the form of an N-best list) hypotheses representing speech represented in the audio data 422. The ASR system 504 interprets the speech in the audio data 422 based on a similarity between the audio data 422 and pre-established language models. For example, the ASR system 504 may compare the audio data 422 with models for sounds (e.g., subword units, such as phonemes, etc.) and sequences of sounds to identify words that match the sequence of sounds of the speech represented in the audio data 422. The ASR system 504 sends the text data generated thereby to a Natural Language Understanding (NLU) system 506, for example via the orchestrator system 502. The text data sent from the ASR system 504 to the NLU system 506 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

Described above is pre-NLU processing with respect to a spoken user input. A user 104 may alternatively provide a text input to the device 418, for example using a virtual keyboard. The device 418 may generate text data representing the text input and send the text data to the servers(s) 118. Upon receipt by the servers(s) 118, the text data may be sent to the orchestrator system 502. The orchestrator component may send the text data to the NLU system 506.

The NLU system 506 attempts to make a semantic interpretation of the phrases or statements represented in the text data input therein. That is, the NLU system 506 determines one or more meanings associated with the phrases or statements represented in the text data based on words represented in the text data. The NLU system 506 determines an intent representing an action that a user 104 desires be performed as well as pieces of the input text data that allow a device (e.g., the device 418, the servers(s) 118, the communication handling system 124, etc.) to execute the intent. For example, if the text data corresponds to "call Allen," the NLU system 506 may determine an intent that the system establish a two-way communication channel between the device 418 originating the call and a device of the recipient "Allen." For further example, if the text data corresponds to "tell Allen I am on my way," the NLU system 506 may determine an intent that the system send a message to a device of the recipient "Allen," with the message corresponding to "I am on my way."

The NLU system 506 outputs NLU results to the orchestrator system 502. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU system 506 in the processing performed to generate the NLU hypothesis associated with the confidence value.

The orchestrator system 502 may send the NLU results to an associated communication speechlet system 508. If the NLU results include multiple NLU hypotheses, the orchestrator system 502 may send a portion of the NLU results corresponding to the top scoring NLU hypothesis to the communication speechlet system 508 associated with the top scoring NLU hypothesis.

A "speechlet" or "speechlet system" may be software running on the servers(s) 118 that is akin to a software application running on a traditional computing device. That is, a communication speechlet system 508 may enable the servers(s) 118 to execute specific functionality in order to perform one or more actions (e.g., provide information to a user, display content to a user, output music, or perform some other requested action). The servers(s) 118 may be configured with more than one communication speechlet system 508. For example, a weather speechlet system may enable the servers(s) 118 to provide weather information, a ride sharing speechlet system may enable the servers(s) 118 to schedule a trip with respect to a ride sharing service, a restaurant speechlet system may enable the servers(s) 118 to order food with respect to a restaurant's online ordering system, the communication speechlet system 508 may enable the system to perform messaging or multi-endpoint communications, etc. The communication speechlet system 508 may operate in conjunction between the servers(s) 118 and other devices such as the device 418 or a communication handling system 124 in order to complete certain functions. Inputs to a communication speechlet system 508 may come from various interactions and input sources.

The functionality described herein as a speechlet or speechlet system may be referred to using many different terms, such as an action, bot, app, or the like.

The communication speechlet system 508 may include hardware, software, firmware, or the like that may be dedicated to the particular communication speechlet system 508 or shared among different communication speechlet systems 508. The communication speechlet system 508 may be part of the servers(s) 118 (as illustrated in FIG. 2) or may be located at whole (or in part) with one or more separate servers. Unless expressly stated otherwise, reference to a speechlet, speechlet device, or speechlet system may include a speechlet system operating within the servers(s) 118 (for example as communication speechlet system 508) and/or speechlet system operating within a server(s) separate from the servers(s) 118.

The communication speechlet system 508 may be configured to perform one or more actions. An ability to perform such action(s) may sometimes be referred to as a "skill." A skill may enable the communication speechlet system 508 to execute specific functionality in order to provide data or produce some other output requested by a user. The particular communication speechlet system 508 may be configured to execute more than one skill. For example, a weather skill may involve a weather speechlet system providing weather information to the servers(s) 118, a ride sharing skill may involve a ride sharing speechlet system scheduling a trip with respect to a ride sharing service, an order pizza skill may involve a restaurant speechlet system ordering pizza with respect to a restaurant's online ordering system, etc.

The communication speechlet system 508 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill.

The orchestrator system 502 may provide as output the user input data 424. For example, the audio data 422 of the speech uttered by the user 104 may be processed by the ARS system 504 and the NLU system 506 to produce the user input data 424. In some implementations the communication speechlet system 508 may implement a communication skill that facilitates communication using the AMD 106, as described herein.

The servers(s) 118 may include a Text To Speech (TTS) system 510 that generates audio data (e.g., synthesized speech) from text data using one or more different methods. In one method of synthesis called unit selection, the TTS system 510 matches text data against a database of recorded speech. The TTS system 510 selects matching units of recorded speech and concatenates the units together to form audio data. In another method of synthesis called parametric synthesis, the TTS system 510 varies parameters such as frequency, volume, and noise to create audio data including an artificial speech waveform. Parametric synthesis uses a computerized voice generator, sometimes called a vocoder.

The servers(s) 118 may include profile data 512. The profile data 512 may include a variety of information related to individual users, groups of users, etc. that interact with the system.

The profile data 512 may include one or more user profiles, with each user profile being associated with a different user identifier. Each user profile may include various user identifying information. Each user profile may also include preferences of the user. Each user profile may also include one or more device identifiers, representing one or more devices of the user.

The profile data 512 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the component(s) of the system(s) and/or user are located.

The servers(s) 118 may include a user recognition component 514 that recognizes one or more users associated with data input to the system. The user recognition component 514 may take as input the audio data 422 and/or text data output by the ASR system 504. The user recognition component 514 determines scores indicating whether user input originated from a particular user. For example, a first score may indicate a likelihood that the user input originated from a first user, a second score may indicate a likelihood that the user input originated from a second user, etc. The user recognition component 514 also determines an overall confidence regarding the accuracy of user recognition operations. The user recognition component 514 may perform user recognition by comparing audio characteristics in the audio data 422 to stored audio characteristics of users. The user recognition component 514 may also perform user recognition by comparing biometric data (e.g., fingerprint data, iris data, etc.), received by the system in correlation with the present user input, to stored biometric data of users. The user recognition component 514 may further perform user recognition by comparing image data (e.g., including a representation of at least a feature of a user), received by the system in correlation with the present user input, with stored image data including representations of features of different users. The user recognition component 514 may perform additional user recognition processes, including those known in the art. Output of the user recognition component 514 may include a single user identifier corresponding to the most likely user that originated the present user input. Alternatively, output of the user recognition component 514 may include an N-best list of user identifiers with respective scores indicating likelihoods of respective users originating the present user input. The output of the user recognition component 514 may be used to inform NLU processing as well as processing performed by other components of the system.

Figure 6:
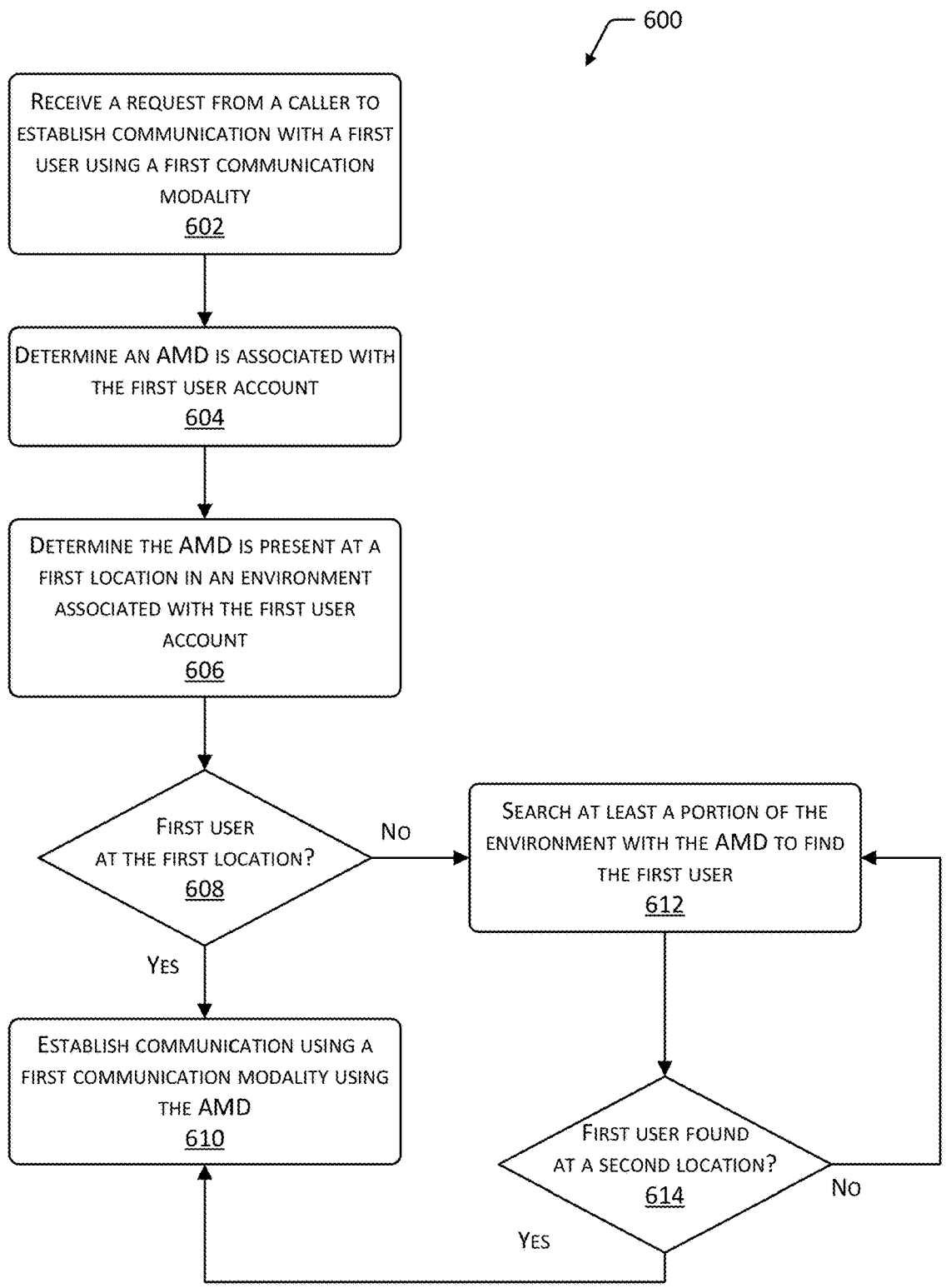
FIG. 6 is a flow diagram of a process to provide AMD assisted communication, according to one implementation.

FIG. 6 is a flow diagram 600 of a process to provide AMD 106 assisted communication, according to one implementation. The process may be implemented at least in part by one or more of the AMD 106, the servers 118, and so forth.

At 602 a request is received from a caller 204 to establish communication with a first user 104 using a first communication modality. For example, the communication handling system 124 may receive a communication request 112 for a video call that is sent by "Allen" with an intended recipient of "Bob". In another example, the communication request 112 may be for a voice call.

At 604 an AMD 106 is determined to be associated with the first user account. For example, the communication handling system 124 may initiate a query of the user account data 126 to determine if the associated device data 406 for the user account associated with the recipient "Bob" includes an AMD 106.

At 606 a determination is made as to whether the AMD 106 is present at a first location in the environment 102. The environment 102 is associated with the first user account. For example, the device location data 416 for the AMD 106 associated with the user account for "Bob" may be queried to determine if the AMD 106 is at Bob's home.

In some implementations the device location data 416 for the AMD 106 may also be determined. For example, the device location data 416 may indicate that the AMD 106 is currently in the "sitting room".

At 608 a determination is made as to whether the first user 104 is at the first location. For example, the AMD 106 may use its onboard sensors to determine if the first user 104 is present in the same room, or within line of sight. If yes, the process proceeds to 610. If no, the process proceeds to 612.

At 610 communication is established with the first user 104 using the first communication modality using the AMD 106 as a communication endpoint. For example, the AMD 106 may provide a user interface that asks the first user 104 whether they would like to accept the incoming call. If the answer is yes, the communication handling system 124 may proceed to establish the call, using the AMD 106 as the communication endpoint.

At 612 the AMD 106 searches at least a portion of the environment 102 to find the first user 104. For example, the AMD system 120 may generate a find user request 130 that includes a search route 428. In some implementations the search route 428 may be based at least in part on data obtained from headless devices 108, sensor(s) 110, and so forth in the environment 102. For example, if a sensor 110 indicates that a room is unoccupied, it may be omitted from the search route 428. The AMD 106 may then travel along the search route 428, gathering sensor data 742 from its sensors and processing that data to determine if the first user 104 is detected. In some implementations, if the AMD 106 encounters a second user 104, the AMD 106 may receive information from the second user 104 and the search route 428 may be updated accordingly. For example, the AMD 106 asks second user 104 "Charlie" where Bob is. Charlie replies that Bob is in the living room. As a result, the search route 428 may be updated to direct the AMD 106 next to the living room.

At 614 the first user 104 is found at a second location. For example, the AMD 106 may enter the living room, and based on the sensor data, determine that the first user 104 "Bob" is present. The process may then proceed to 610 and establish communication.

If at 614 the first user 104 is not found at the second location, the process may return to 612, and the AMD 106 may continue to search for the first user 104. The search may end when one or more of the first user 104 is found, if the search is discontinued, when traversal of the search routes 428 have been completed, and so forth.

Figure 7:
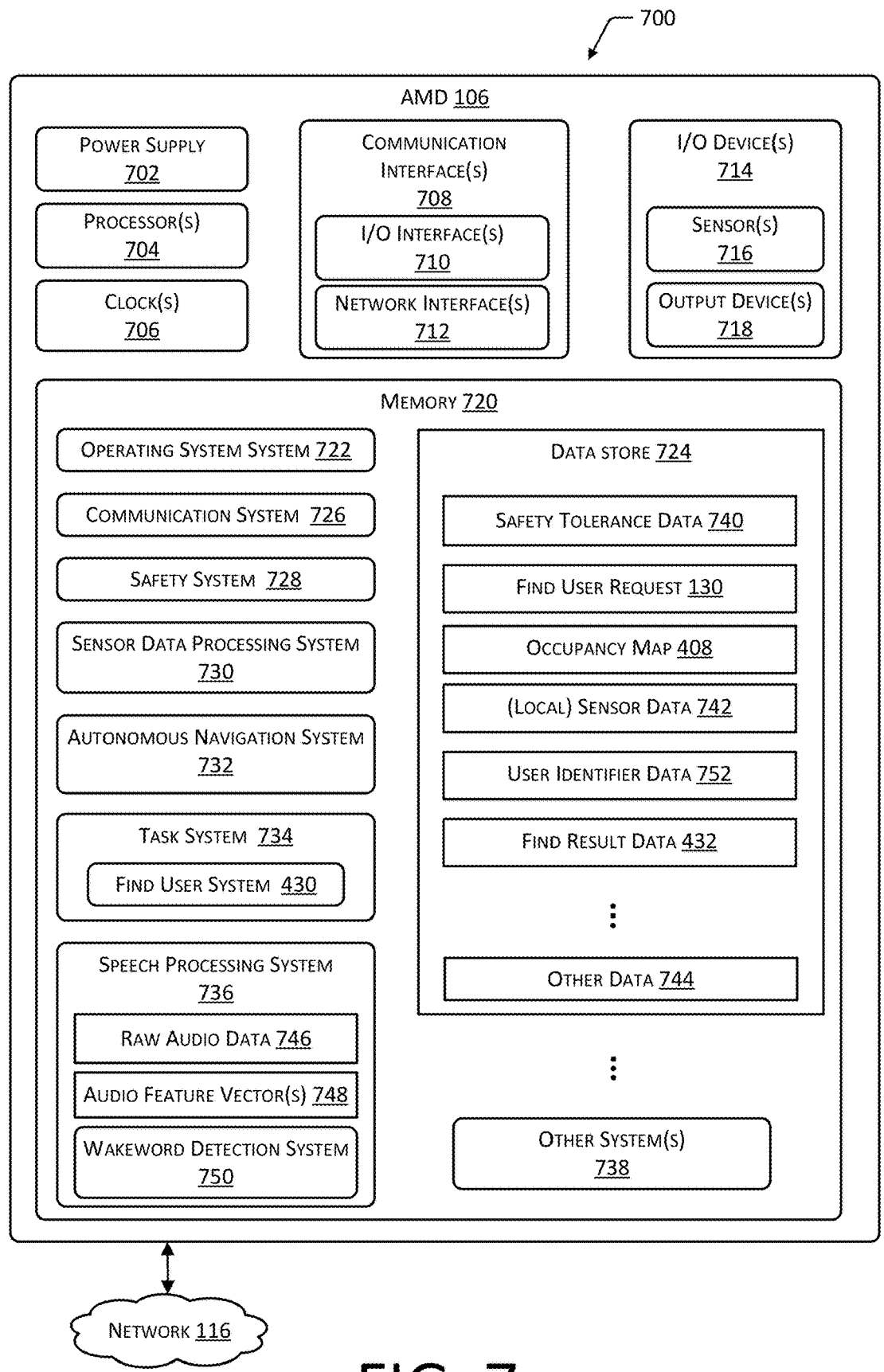
FIG. 7 is a block diagram of the AMD, according to some implementations.

FIG. 7 is a block diagram 700 of the AMD 106, according to some implementations.

The AMD 106 may include one or more power supplies 702 to provide electrical power suitable for operating the components in the AMD 106. The one or more power supplies 702 may comprise batteries, capacitors, fuel cells, photovoltaic cells, wireless power receivers, wireless power receivers, conductive couplings suitable for attachment to an external power source such as provided by an electric utility, and so forth. The AMD 106 may implement multiple separate power supplies 702. For example, a first power supply may be used to provide electrical power to one or more motors of the AMD 106 while a second power supply is used to provide electrical power to other electronics such as processors, communication interfaces, sensors, and so forth.

The AMD 106 may include one or more hardware processors 704 (processors) configured to execute one or more stored instructions. The processors 704 may comprise one or more cores. The processors 704 may include microcontrollers, systems on a chip, field programmable gate arrays, digital signals processors, graphic processing units, general processing units, and so forth. One or more clocks 706 may provide information indicative of date, time, ticks, and so forth. For example, the processor 704 may use data from the clock 706 to associate a particular interaction with a particular point in time.

The AMD 106 may include one or more communication interfaces 708 such as input/output (I/O) interfaces 710, network interfaces 712, and so forth. The communication interfaces 708 enable the AMD 106, or components thereof, to communicate with other devices or components. The communication interfaces 708 may include one or more I/O interfaces 710. The I/O interfaces 710 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 710 may couple to one or more I/O devices 714. The I/O devices 714 may include input devices such as one or more of sensors 716, keyboard, mouse, scanner, and so forth. The I/O devices 714 may also include output devices 718 such as one or more of a motor, light, speaker, display, projector, printer, and so forth. In some embodiments, the I/O devices 714 may be physically incorporated with the AMD 106 or may be externally placed.

The network interfaces 712 may be configured to provide communications between the AMD 106 and other devices such as other AMDs 106, a docking station, routers, access points, and so forth. The network interfaces 712 may include devices configured to couple to personal area networks (PANs), local area networks (LANs), wireless local area networks (WLANS), wide area networks (WANs), and so forth. For example, the network interfaces 712 may include devices compatible with Ethernet, Wi-Fi, Bluetooth, Bluetooth Low Energy, ZigBee, and so forth.

The AMD 106 may also include one or more busses or other internal communications hardware or software that allow for the transfer of data between the various systems and components of the AMD 106.

As shown in FIG. 7, the AMD 106 includes one or more memories 720. The memory 720 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 720 provides storage of computer-readable instructions, data structures, program systems, and other data for the operation of the AMD 106. A few example functional systems are shown stored in the memory 720, although the same functionality may alternatively be implemented in hardware, firmware, or as a system on a chip (SoC).

The memory 720 may include at least one operating system (OS) system 722. The OS system 722 is configured to manage hardware resource devices such as the I/O interfaces 710, the I/O devices 714, the communication interfaces 708, and provide various services to applications or systems executing on the processors 704. The OS system 722 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the AMD Operating System (ROS) as promulgated at www.ros.org, and so forth.

Also stored in the memory 720 may be a data store 724 and one or more of the following systems. These systems may be executed as foreground applications, background tasks, daemons, and so forth. The data store 724 may use a flat file, database, linked list, tree, executable code, script, or other data structure to store information. In some implementations, the data store 724 or a portion of the data store 724 may be distributed across one or more other devices including other AMDs 106, servers, network attached storage devices, and so forth.

A communication system 726 may be configured to establish communication with other devices, such as other AMDs 106, an external server, a docking station, and so forth. The communications may be authenticated, encrypted, and so forth.

Other systems within the memory 720 may include a safety system 728, a sensor data processing system 730, an autonomous navigation system 732, a task system 734, the find user system 430, a speech processing system 736, or other systems 738. The systems may access data stored within the data store 724, such as safety tolerance data 740, find user request 130, (local) sensor data 742, or other data 744. In some implementations the sensor data 420 processed by the system may include at least a portion of the (local) sensor data 742 or information based at least in part on the (local) sensor data 742.

The safety system 728 may access safety tolerance data 740 to determine within what tolerances the AMD 106 may operate safely within the physical environment 102. For example, the safety tolerance data 740 may specify a minimum sound threshold which, when exceeded, stops all movement of the AMD 106. Continuing this example, detection of sound such as a human yell would stop the AMD 106. In another example, the safety system 728 may access safety tolerance data 740 that specifies a minimum distance from an object that the AMD 106 may maintain. Continuing this example, when a sensor 716 detects an object has approached to less than the minimum distance, all movement of the AMD 106 may be stopped. Movement of the AMD 106 may be stopped by one or more of inhibiting operations of one or more of the motors, issuing a command to stop motor operation, disconnecting power from one or more the motors, and so forth. The safety system 728 may be implemented as hardware, software, or a combination thereof.

The safety system 728 may control other factors, such as a maximum speed of the AMD 106 based on information obtained by the sensors 716, precision and accuracy of the sensor data 742, and so forth. For example, detection of an object by an optical sensor 716 may include some error, such as when the distance to an object comprises a weighted average between an object and a background. As a result, the maximum speed permitted by the safety system 728 may be based on one or more factors such as the weight of the AMD 106, nature of the floor, distance to object, and so forth.

The sensor data processing system 730 may access sensor data 742 that is acquired from one or more the sensors 716. The sensor data processing system 730 may provide various processing functions such as de-noising, filtering, change detection, and so forth. Processing of sensor data 742, such as images from a camera sensor 716, may be performed by a system implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 742. In still another implementation, functions such as those in the Machine Vision Toolbox for Matlab (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 742 or other data 744. For example, the ANN may be a trained using a supervised learning algorithm such that object identifiers are associated with images of particular objects within training images provided to the ANN. Once trained, the ANN may be provided with the sensor data 742 and produce output indicative of the object identifier.

The autonomous navigation system 732 provides the AMD 106 with the ability to navigate within the physical environment 102 without real-time human interaction. For example, the autonomous navigation system 732 may implement one or more simultaneous localization and mapping ("SLAM") techniques to determine the occupancy map 408 or other representation of the physical environment 102. The SLAM algorithms may utilize one or more of maps, algorithms, beacons, or other techniques to provide navigational data. The navigational data may then be used to determine a path which is then subsequently used to determine a set of commands that drive the motors connected to the wheels. For example, the autonomous navigation system 732 may access environment map data during operation to determine relative location, estimate a path to a destination, and so forth.

The autonomous navigation system 732 may include an obstacle avoidance system. For example, if an obstacle is detected along a planned route, the obstacle avoidance system may re-route the AMD 106 to move around the obstacle or take an alternate route.

The autonomous navigation system 732 may utilize various techniques during processing of sensor data 742. For example, image data obtained from cameras may be processed to determine one or more of corners, edges, planes, and so forth. In some implementations corners may be detected and the coordinates of those corners may be used to produce point cloud data.

The occupancy map 408 may be manually or automatically determined. Continuing the example, during the learning phase, or subsequent operation, the AMD 106 may generate an occupancy map 408 that is indicative of locations of obstacles such as chairs, doors, stairwells, and so forth.

In some implementations, the occupancy map 408 may include floor characterization data. The floor characterization data is indicative of one or more attributes of the floor at a particular location within the physical environment 102. During operation of the AMD 106, floor characterization data may be obtained. The floor characterization data may be used by the autonomous navigation system 732 assist in the determination of the current location of the AMD 106 within the home. For example, if the autonomous navigation system 732 determines that the AMD 106 is located in the dining room, but the floor characterization data indicates that the floors are consistent with the living room, an error condition may be generated in which other techniques are used to determine the location of the AMD 106 or otherwise resolve the difference. For example, the AMD 106 may attempt to return to the docking station and then, using information about the path traveled, determine the previously ambiguous location within the home.

The floor characterization data may include one or more of a location designator, floor type, floor texture, coefficient of friction, surface resistivity, color, and so forth. The location designator may be specified based on input from the user 104. For example, the AMD 106 may use speech synthesis to ask the user "what room is this?" during a training phase. The utterance of the user 104 may be received by the microphone array and the audio data "this is the living room" may processed and subsequently used to generate the location designator. The floor type may comprise information indicative of the type of flooring associated with a particular location designator. For example, the floor type may be indicative of types such as carpet, wood, tile, and so forth. The floor texture comprises information indicative of the surface texture of the floor, such as whether it is rough, smooth, medium, and so forth. The floor texture may be determined using data obtained from a floor optical motion sensor (FOMS) that is described below with regard to FIG. 8. For example, the texture may be detectable by the FOMS. The coefficient of friction provides data indicative of how slippery the floor is. For example, a very low coefficient of friction is indicative of a slippery surface while high coefficient of friction is a surface in which slippage is minimal. In one implementation, the coefficient of friction may be determined based on data from a friction probe that is in contact with the floor. In another implementation, a predetermined amount of breaking or drag may be applied to one or more of the wheels and the coefficient of friction may be determined based on previously defined parameters such as wheel resistance, amount of breaking applied, amount of power applied to drive wheels, and so forth. In effect, this implementation uses one of the wheels to provide selective drag that is then used to determine the coefficient of friction.

The surface resistivity comprises data indicative of the electrical resistivity of the surface. For example, surface resistivity may be measured between two or more of the conductive wheels as described above. Different types of floor may exhibit different surface resistivity, and changes in that surface resistivity may be used indicate changing conditions. For example, a change in the surface resistivity for a particular portion of the floor may be indicative of the presence of water or other liquid on the floor.

The color of the floor may be determined using input from one or more of cameras 844, floor optical motion sensors (FOMS) 816, and so forth. For example, one or more the navigation cameras 844 that are mounted on the front of the AMD 106 may be used to acquire color data that is used to determine a color of the floor. In another example, where the FOMS utilize optoelectronic devices that can determine different colors, output from the FOMS may be used to provide the color data.

The autonomous navigation system 732 may be used to move the AMD 106 from a first location to a second location within the physical environment 102. This movement may be responsive to determination made by an onboard processor 704, in response to a command received via one or more communication interfaces 708 or a sensor 716, and so forth. For example, an external server may send a command that is subsequently received using a network interface 712. This command may direct the AMD 106 to proceed to a designated destination, such as "living room" or "dining room". The AMD 106 may then process this command, and use the autonomous navigation system 732 to determine the directions and distances associated with reaching the specified destination.

The memory 720 may store one or more task system 734. A task system 734 comprises instructions that, when executed, provide one or more functions associated with a particular task. In one example, the task may comprise a security or watchmen task in which the AMD 106 travels throughout the physical environment 102 looking for events that exceed predetermined thresholds. Continuing the example, if the AMD 106 detects that ambient temperature is below a minimum level, or that water is present on the floor, or detects sound of broken glass, an alert may be generated. The alert may be given as an audible, visual, or electronic notification. For example, the electronic notification may involve the AMD 106 transmitting data using one or more the communication interfaces 708.

In another example, the task may comprise a "follow me" feature in which the AMD 106 follows a user. For example, the user may participate in a video call using the AMD 106. A camera 844 on a mast 1004 may be used to acquire video for transmission while the display is used to present video that is received. The AMD 106 may use data from one or more sensors 716 to determine a location of the user relative to the AMD 106, and track and follow the user. In one implementation, computer vision techniques may be used to locate the user within image data acquired by the cameras 844. In another implementation, the user's voice may be detected by an array of microphones, and a direction to the voice with respect to the AMD 106 may be established. Other techniques may be utilized either alone or in combination to allow the AMD 106 to track a user, follow a user, or track and follow a user.

In yet another example, the task may allow for the AMD 106 to be summoned to a particular location. The user may utter a voice command that is heard by a microphone on the AMD 106, a microphone in a smart phone, or another device with a microphone such as a network enabled speaker or television. Alternatively, the user may issue a command using an app on a smartphone, wearable device, tablet, or other computing device. Given that the location of the device at which the command was obtained is known, the AMD 106 may be dispatched to that location. Alternatively, if the location is unknown, the AMD 106 may search for the user.

The speech processing system 736 may be used to process utterances of the user. Microphones 846 may acquire audio in the presence of the AMD 106 and may send raw audio data 746 to an acoustic front end (AFE). The AFE may transform the raw audio data 746 (for example, a single-channel, 16-bit audio stream sampled at 16 kHz), captured by the microphone 846, into audio feature vectors 748 that may ultimately be used for processing by various components, such as a wakeword detection system 750, speech recognition engine, or other components. The AFE may reduce noise in the raw audio data 746. The AFE may also perform acoustic echo cancellation (AEC) or other operations to account for output audio data that may be sent to a speaker of the AMD 106 for output. For example, the AMD 106 may be playing music or other audio that is being received from a network 116 in the form of output audio data. To avoid the output audio interfering with the device's ability to detect and process input audio, the AFE or other component may perform echo cancellation to remove the output audio data from the input raw audio data 746, or other operations.

The AFE may divide the audio data into frames representing time intervals for which the AFE determines a number of values (i.e., features) representing qualities of the raw audio data 746, along with a set of those values (i.e., a feature vector or audio feature vector) representing features/ qualities of the raw audio data 746 within each frame. A frame may be a certain period of time, for example a sliding window of 75 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 746, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 748 (or the raw audio data 746) may be input into a wakeword detection system 750 that is configured to detect keywords spoken in the audio. The wakeword detection system 750 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 106 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 106 (or separately from speech detection), the AMD 106 may use the wakeword detection system 750 to perform wakeword detection to determine when a user intends to speak a command to the AMD 106. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection system 750 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 106 may "wake" and begin transmitting audio data (which may include one or more audio feature vectors 748 or the raw audio data 746) to one or more server(s) 118 for speech processing. The audio data corresponding to audio obtained by the microphone 846 may be sent to a server(s) 118 for routing to a recipient device or may be sent to the server(s) 118 for speech processing for interpretation of the included speech (either for purposes of enabling voice-communications and/or for purposes of executing a command in the speech). The audio data may include data corresponding to the wakeword, or the portion of the audio data corresponding to the wakeword may be removed by the local AMD 106 prior to sending.

The AMD 106 may connect to the network 116 using one or more of the network interfaces 712. One or more servers 118 may provide various functions, such as ASR, natural language understanding (NLU), providing content such as audio or video to the AMD 106, and so forth. For example, the raw audio data 746 may be provided to the audio system 122 for processing.

The other systems 738 may provide other functionality, such as object recognition, speech recognition, speech synthesis, user identification, and so forth. For example, an ASR system may accept as input raw audio data 746 or audio feature vectors 748 and may produce as output a text string that is further processed and used to provide input, initiate operation of the autonomous navigation system 732, a task system 734, and so forth. In one implementation, the text string may be sent via a network 116 to server(s) 118 for further processing. The AMD 106 may receive a response from the server(s) 118 and present output, perform an action, and so forth. For example, the raw audio data 746 may include the user saying "AMD go to the dining room". The audio data representative of this utterance may be sent to the server(s) 118 that return commands directing the AMD 106 to the dining room of the home associated with the AMD 106.

The utterance may result in a response from the server(s) 118 that directs operation of other devices or services. For example, the user may say "AMD wake me at seven tomorrow morning". The audio data may be sent to the server(s) 118 that determines the intent and generates commands to instruct a device attached to the network 116 to play an alarm at 7:00 am the next day.

The other systems 738 may comprise a speech synthesis system that is able to convert text data to human speech. For example, the speech synthesis system may be used by the AMD 106 to provide speech that a user is able to understand.

The data store 724 may also store additional data such as user identifier data 752 that is indicative of the user identifier of a user associated with the AMD 106. For example, one or more of the raw audio data 746 or the audio feature vectors 748 may be processed to determine the user identifier data 752 of a user based on the sound of the user's voice. In another implementation an image of the user may be acquired using one or more cameras and processed using a facial recognition system to determine the user identifier data 752.

Figure 8:
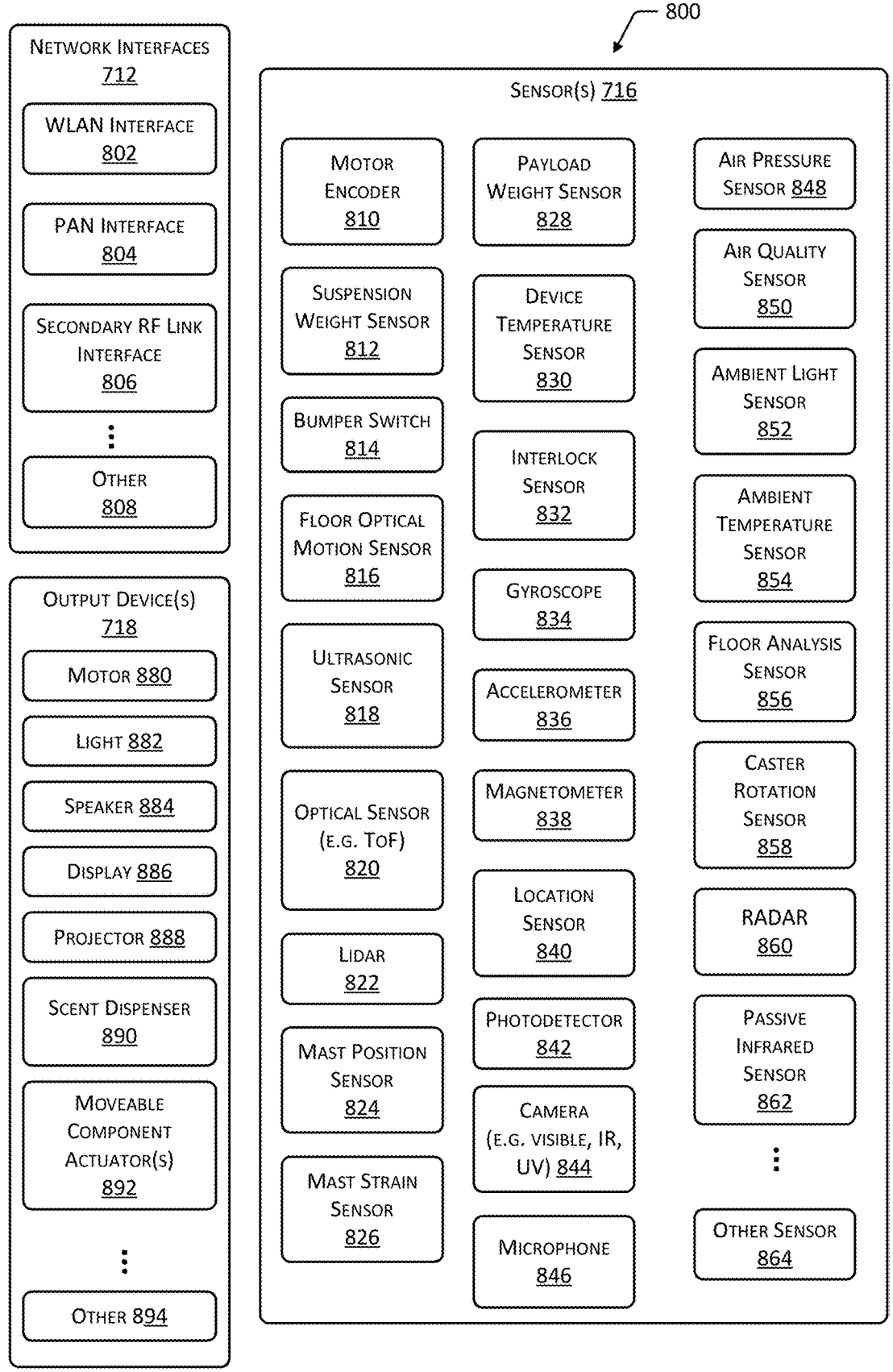
FIG. 8 is a block diagram of some components of the AMD such as network interfaces, sensors, and output devices, according to some implementations.

FIG. 8 is a block diagram 800 of some components of the AMD 106 such as network interfaces 710, sensors 716, and output devices 718, according to some implementations. The components illustrated here are provided by way of illustration and not necessarily as a limitation. For example, the AMD 106 may utilize a subset of the particular network interfaces 710, output devices 718, or sensors 716 depicted here, or may utilize components not pictured.

The network interfaces 710 may include one or more of a WLAN interface 802, PAN interface 804, secondary radio frequency (RF) link interface 806, or other interface 808. The WLAN interface 802 may be compliant with at least a portion of the Wi-Fi specification. For example, the WLAN interface 802 may be compliant with the least a portion of the IEEE 802.11 specification as promulgated by the Institute of Electrical and Electronics Engineers (IEEE). The PAN interface 804 may be compliant with at least a portion of one or more of the Bluetooth, wireless USB, Z-Wave, ZigBee, or other standards. For example, the PAN interface 804 may be compliant with the Bluetooth Low Energy (BLE) specification.

The secondary RF link interface 806 may comprise a radio transmitter and receiver that operate at frequencies different from or using modulation different from the other interfaces. For example, the WLAN interface 802 may utilizes frequencies in the 2.4 GHz and 5 GHz Industrial Scientific and Medicine (ISM) bands, while the PAN interface 804 may utilize the 2.4 GHz ISM bands. The secondary RF link interface 806 may comprise a radio transmitter that operates in the 900 MHz ISM band, within a licensed band at another frequency, and so forth. The secondary RF link interface 806 may be utilized to provide backup communication between the AMD 106 and other devices in the event that communication fails using one or more of the WLAN interface 802 or the PAN interface 804. For example, in the event the AMD 106 travels to an area within the physical environment 102 that does not have Wi-Fi coverage, the AMD 106 may use the secondary RF link interface 806 to communicate with another device such as a specialized access point, docking station, or other AMD 106.

The other 808 network interfaces may include other equipment to send or receive data using other wavelengths or phenomena. For example, the other 808 network interface may include an ultrasonic transceiver used to send data as ultrasonic sounds, a visible light system that communicates via by modulating a visible light source such as a light-emitting diode, and so forth. In another example, the other 808 network interface may comprise a wireless wide area network (WWAN) interface or a wireless cellular data network interface. Continuing the example, the other 808 network interface may be compliant with at least a portion of the 8G, 4G, LTE, or other standards.

The AMD 106 may include one or more of the following sensors 716. The sensors 716 depicted here are provided by way of illustration and not necessarily as a limitation. It is understood other sensors 716 may be included or utilized by the AMD 106, while some sensors 716 may be omitted in some configurations.

A motor encoder 810 provides information indicative of the rotation or linear extension of a motor. The motor may comprise a rotary motor, or a linear actuator. In some implementations, the motor encoder 810 may comprise a separate assembly such as a photodiode and encoder wheel that is affixed to the motor. In other implementations, the motor encoder 810 may comprise circuitry configured to drive the motor. For example, the autonomous navigation system 732 may utilize the data from the motor encoder 810 to estimate a distance traveled.

A suspension weight sensor 812 provides information indicative of the weight of the AMD 106 on the suspension system for one or more of wheels 902 or a caster 904. For example, the suspension weight sensor 812 may comprise a switch, strain gauge, load cell, photodetector, or other sensing element that is used to determine whether weight is applied to a particular wheel, or whether weight has been removed from the wheel. In some implementations, the suspension weight sensor 812 may provide binary data such as a "1" value indicating that there is a weight applied to the wheel, while a "0" value indicates that there is no weight applied to the wheel 902. In other implementations, the suspension weight sensor 812 may provide an indication such as so many kilograms of force or newtons of force. The suspension weight sensor 812 may be affixed to one or more of the wheels 902 or the caster 904. In some situations, the safety system 728 may use data from the suspension weight sensor 812 to determine whether or not to inhibit operation of one or more of the motors. For example, if the suspension weight sensor 812 indicates no weight on the suspension, the implication is that the AMD 106 is no longer resting on its wheels 902, and thus operation of the motors may be inhibited. In another example, if the suspension weight sensor 812 indicates weight that exceeds a threshold value, the implication is that something heavy is resting on the AMD 106 and thus operation of the motors may be inhibited.

One or more bumper switches 814 provide an indication of physical contact between a bumper or other member that is in mechanical contact with the bumper switch 814. Safety system 728 utilize sensor data 742 obtained by the bumper switches 814 to modify the operation of the AMD 106. For example, if the bumper switch 814 associated with a front of the AMD 106 is triggered, the safety system 728 may drive the AMD 106 backwards.

A floor optical motion sensor (FOMS) 816 provides information indicative of motions of the AMD 106 relative to the floor or other surface underneath the AMD 106. In one implementation, the FOMS 816 may comprise a light source such as light-emitting diode (LED), an array of photodiodes, and so forth. In some implementations, the FOMS 816 may utilize an optoelectronic sensor, such as a low resolution two-dimensional array of photodiodes. Several techniques may be used to determine changes in the data obtained by the photodiodes and translate this into data indicative of a direction of movement, velocity, acceleration, and so forth. In some implementations, the FOMS 816 may provide other information, such as data indicative of a pattern present on the floor, composition of the floor, color of the floor, and so forth. For example, the FOMS 816 may utilize an optoelectronic sensor that may detect different colors or shades of gray, and this data may be used to generate floor characterization data.

An ultrasonic sensor 818 utilize sounds in excess of 20 kHz to determine a distance from the sensor to an object. The ultrasonic sensor 818 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 818 may provide information indicative of a presence of an object, distance to the object, and so forth. Two or more ultrasonic sensors 818 be utilized in conjunction with one another to determine a location within a two-dimensional plane of the object.

In some implementations, the ultrasonic sensor 818 or portion thereof may be used to provide other functionality. For example, the emitter of the ultrasonic sensor 818 may be used to transmit data and the detector may be used to receive data transmitted that is ultrasonic sound. In another example, the emitter of an ultrasonic sensor 818 may be set to a particular frequency and used to generate a particular waveform such as a sawtooth pattern to provide a signal that is audible to an animal, such as a dog or a cat.

An optical sensor 820 may provide sensor data 742 indicative of one or more of a presence or absence of an object, a distance to the object, or characteristics of the object. The optical sensor 820 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 820 may utilize one or more sensing elements. For example, the optical sensor 820 may comprise a 4×4 array of light sensing elements. Each individual sensing element may be associated with a field of view (FOV) that is directed in a different way. For example, the optical sensor 820 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 716 such as an image sensor or camera. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 820 may operate as a depth camera, providing a two-dimensional image of a scene, as well as data that indicates a distance to each pixel.

Data from the optical sensors 820 may be utilized for collision avoidance. For example, safety system 728 and the autonomous navigation system 732 may utilize the sensor data 742 indicative of the distance to an object in order to prevent a collision with that object.

Multiple optical sensors 820 may be operated such that their FOV overlap at least partially. To minimize or eliminate interference, the optical sensors 820 may selectively control one or more of the timing, modulation, or frequency of the light emitted. For example, a first optical sensor 820 may emit light modulated at 80 kHz while a second optical sensor 820 emits light modulated at 83 kHz.

A lidar 822 sensor provides information indicative of a distance to an object or portion thereof by utilizing laser light. The laser is scanned across a scene at various points, emitting pulses which may be reflected by objects within the scene. Based on the time-of-flight a distance to that particular point, sensor data 742 may be generated that is indicative of the presence of objects and the relative positions, shapes, and so forth is visible to the lidar 822. Data from the lidar 822 may be used by various systems. For example, the autonomous navigation system 732 may utilize point cloud data generated by the lidar 822 for localization of the AMD 106 within the physical environment.

A mast position sensor 824 provides information indicative of a position of the mast. For example, the mast position sensor 824 may comprise limit switches associated with the mast extension mechanism that indicate whether the mast is an extended or retracted position. In other implementations, the mast position sensor 824 may comprise an optical code on at least a portion of the mast that is then interrogated by an optical emitter and a photodetector to determine the distance which the mast is extended. In another implementation, the mast position sensor 824 may comprise an encoder wheel that is attached to a mast motor that is used to raise or lower the mast. The mast position sensor 824 may provide data to the safety system 728. For example, if the AMD 106 is preparing to move, data from the mast position sensor 824 may be checked to determine if the mast is retracted, and if not, the mast may be retracted prior to beginning movement.

A mast strain sensor 826 provides information indicative of a strain on the mast with respect to the remainder of the AMD 106. For example, the mast strain sensor 826 may comprise strain gauge or load cell that measures a side-load applied to the mast or a weight on the mast or downward pressure on the mast. The safety system 728 may utilize sensor data 742 obtained by the mast strain sensor 826. For example, if the strain applied to the mast exceeds a threshold amount, the safety system 728 may direct an audible and visible alarm to be presented by the AMD 106.

A payload weight sensor 828 provides information indicative of the weight associated with a modular payload bay 1002. The payload weight sensor 828 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 828 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 828 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety system 728 may utilize the payload weight sensor 828 to determine if the modular payload bay 1002 has been overloaded. If so, an alert or notification may be issued.

One or more device temperature sensors 830 may be utilized by the AMD 106. The device temperature sensors 830 provide temperature data of one or more components within the AMD 106. For example, a device temperature sensor 830 may indicate a temperature of one or more the batteries 106, one or more motors, and so forth. In the event the temperature exceeds a threshold value, the component associated with that device temperature sensor 830 may be shut down.

One or more interlock sensors 832 may provide data to the safety system 728 or other circuitry that prevents the AMD 106 from operating in an unsafe condition. For example, the interlock sensors 832 may comprise switches that indicate whether an access panel is open. The interlock sensors 832 may be configured to inhibit operation of the AMD 106 until the interlock switch indicates a safe condition is present.

A gyroscope 834 may provide information indicative of rotation of an object affixed thereto. For example, gyroscope 834 may generate sensor data 742 that is indicative of a change in orientation of the AMD 106 or portion thereof.

An accelerometer 836 provides information indicative of a direction and magnitude of an imposed acceleration. Data such as rate of change, determination of changes in direction, speed, and so forth may be determined using the accelerometer 836. The accelerometer 836 may comprise mechanical, optical, micro-electromechanical, or devices. For example, the gyroscope 834 in the accelerometer 836 may comprise a prepackaged solid-state inertial measurement unit (IMU) that provides multiple axis gyroscopes 834 and accelerometers 836.

A magnetometer 838 may be used to determine an orientation by measuring ambient magnetic fields, such as the terrestrial magnetic field. For example, the magnetometer 838 may comprise a Hall effect transistor that provides output compass data indicative of a magnetic heading.

The AMD 106 may include one or more locations sensor 840. The location sensors 840 may comprise an optical, radio, or other navigational system such as a global positioning system (GPS) receiver. For indoor operation, the location sensors 840 may comprise indoor position systems, such as using Wi-Fi Positioning Systems (WPS). The location sensors 840 may provide information indicative of a relative location, such as "living room" or an absolute location such as particular coordinates indicative of latitude and longitude, or displacement with respect to a predefined origin.

A photodetector 842 provide sensor data 742 indicative of impinging light. For example, the photodetector 842 may provide data indicative of a color, intensity, duration, and so forth.

A camera 844 generates sensor data 742 indicative of one or more images. The camera 844 may be configured to detect light in one or more wavelengths including, but not limited to, terahertz, infrared, visible, ultraviolet, and so forth. For example, an infrared camera 844 may be sensitive to wavelengths between approximately 700 nanometers and 1 millimeter. The camera 844 may comprise charge coupled devices (CCD), complementary metal oxide semiconductor (CMOS) devices, microbolometers, and so forth. The AMD 106 may use image data acquired by the camera 844 for object recognition, navigation, collision avoidance, user communication, and so forth. For example, a pair of cameras 844 sensitive to infrared light may be mounted on the front of the AMD 106 to provide binocular stereo vision, with the sensor data 742 comprising images being sent to the autonomous navigation system 732. In another example, the camera 844 may comprise a 10 megapixel or greater camera that is used for videoconferencing or for acquiring pictures for the user 104.

The camera 844 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 844, particularly those associated with navigation or autonomous operation, may utilize a global shutter. In other implementations, the camera(s) 844 providing images for use by the autonomous navigation system 732 may be acquired using a rolling shutter and subsequently may be processed to mitigate image artifacts. One or more microphones 846 may be configured to acquire information indicative of sound present in the physical environment. In some implementations, arrays of microphones 846 may be used. These arrays may implement beamforming techniques to provide for directionality of gain. The AMD 106 may use the one or more microphones 846 to acquire information from acoustic tags, accept voice input from users 102, determine ambient noise level, for voice communication with another user or system, and so forth.

An air pressure sensor 848 may provide information indicative of an ambient atmospheric pressure or changes in ambient atmospheric pressure. For example, the air pressure sensor 848 may provide information indicative of changes in air pressure due to opening and closing of doors, weather events, and so forth.

An air quality sensor 850 may provide information indicative of one or more attributes of the ambient atmosphere. For example, the air quality sensor 850 may include one or more chemical sensing elements to detect the presence of carbon monoxide, carbon dioxide, ozone, and so forth. In another example, the air quality sensor 850 may comprise one or more elements to detect particulate matter in the air, such as the photoelectric detector, ionization chamber, and so forth. In another example, the air quality sensor 850 may include hygrometer that provides information indicative of relative humidity.

An ambient light sensor 852 may comprise one or more photodetector's or other light-sensitive elements that are used to determine one or more of the color, intensity, duration of ambient lighting around the AMD 106.

An ambient temperature sensor 854 provides information indicative of the temperature of the ambient environment proximate to the AMD 106. In some implementations, an infrared temperature sensor may be utilized to determine the temperature of another object at a distance.

A floor analysis sensor 856 may include one or more components that are used to generate at least a portion of the floor characterization data. In one implementation, floor analysis sensor 856 may comprise circuitry that may be used to determine one or more of the electrical resistance, electrical inductance, or electrical capacitance of the floor. For example, two or more of the wheels 902 in contact with the floor may include an allegedly conductive pathway between the circuitry and the floor. By using two or more of these wheels 902, the circuitry may measure one or more of the electrical properties of the floor. Information obtained by the floor analysis sensor 856 may be used by one or more of the safety system 728, the autonomous navigation system 732 the task system 734, and so forth. For example, if the floor analysis sensor 856 determines that the floor is wet, the safety system 728 may decrease the speed of the AMD 106 and generate a notification alerting the user 104.

The floor analysis sensor 856 may include other components as well. For example, coefficient of friction sensor may comprise a probe that comes into contact with the surface and determines the coefficient of friction between the probe and the floor.

A caster rotation sensor 858 provides data indicative of one or more of a direction of orientation, angular velocity, linear speed of the caster, and so forth. For example, the caster rotation sensor 858 may comprise an optical encoder and corresponding target that is able to determine that the caster 904 transitioned from an angle of 0° at a first time to 49° at a second time.

The sensors 716 may include a radar 860. The radar 860 may be used to provide information as to a distance, lateral position, and so forth, to an object.

The sensors 716 may include a passive infrared (PIR) sensor 862. The PIR 862 may be used to detect the presence of people, pets, hotspots, and so forth. For example, the PIR 862 may be configured to detect infrared radiation with wavelengths between 8 and 14 micrometers.

The AMD 106 may include other sensors 864 as well. For example, a capacitive proximity sensor may be used to provide proximity data to adjacent objects. Other sensors 864 may include radio frequency identification (RFID) readers, near field communication (NFC) systems, coded aperture camera, and so forth. For example, NFC tags may be placed at various points within the physical environment to provide landmarks for the autonomous navigation system 732. One or more touch sensors may be utilized to determine contact with a user 104 or other object.

The AMD 106 may include one or more output devices 718. A motor 880 may be used to provide linear or rotary motion. A light 882 may be used to emit photons. A speaker 884 may be used to emit sound. A display 886 may comprise one or more of a liquid crystal display, light emitting diode display, electrophoretic display, cholesterol display, interferometric display, and so forth. The display 886 may be used to present visible information such as graphics, pictures, text, and so forth. In some implementations, the display 886 may comprise a touchscreen that combines a touch sensor and a display 886.

In some implementations, the AMD 106 may be equipped with a projector 888. The projector 888 may be able to project an image on the surface, such as the floor, wall, ceiling, and so forth.

A scent dispenser 890 be used to emit one or more smells. For example, the scent dispenser 890 may comprise a plurality of different scented liquids that may be evaporated or vaporized in a controlled fashion to release predetermined amounts of each.

One or more moveable component actuators 892 may comprise an electrically operated mechanism such as one or more of a motor, solenoid, piezoelectric material, electroactive polymer, shape-memory alloy, and so forth. For example, the display of the AMD 106 or other moveable component may be moved by one or more moveable component actuators 892.

In other implementations, other 894 output devices may be utilized. For example, the AMD 106 may include a haptic output device that provides output that produces particular touch sensations to the user. Continuing the example, a motor 880 with an eccentric weight may be used to create a buzz or vibration to allow the AMD 106 to simulate the purr of a cat.

Figure 9:
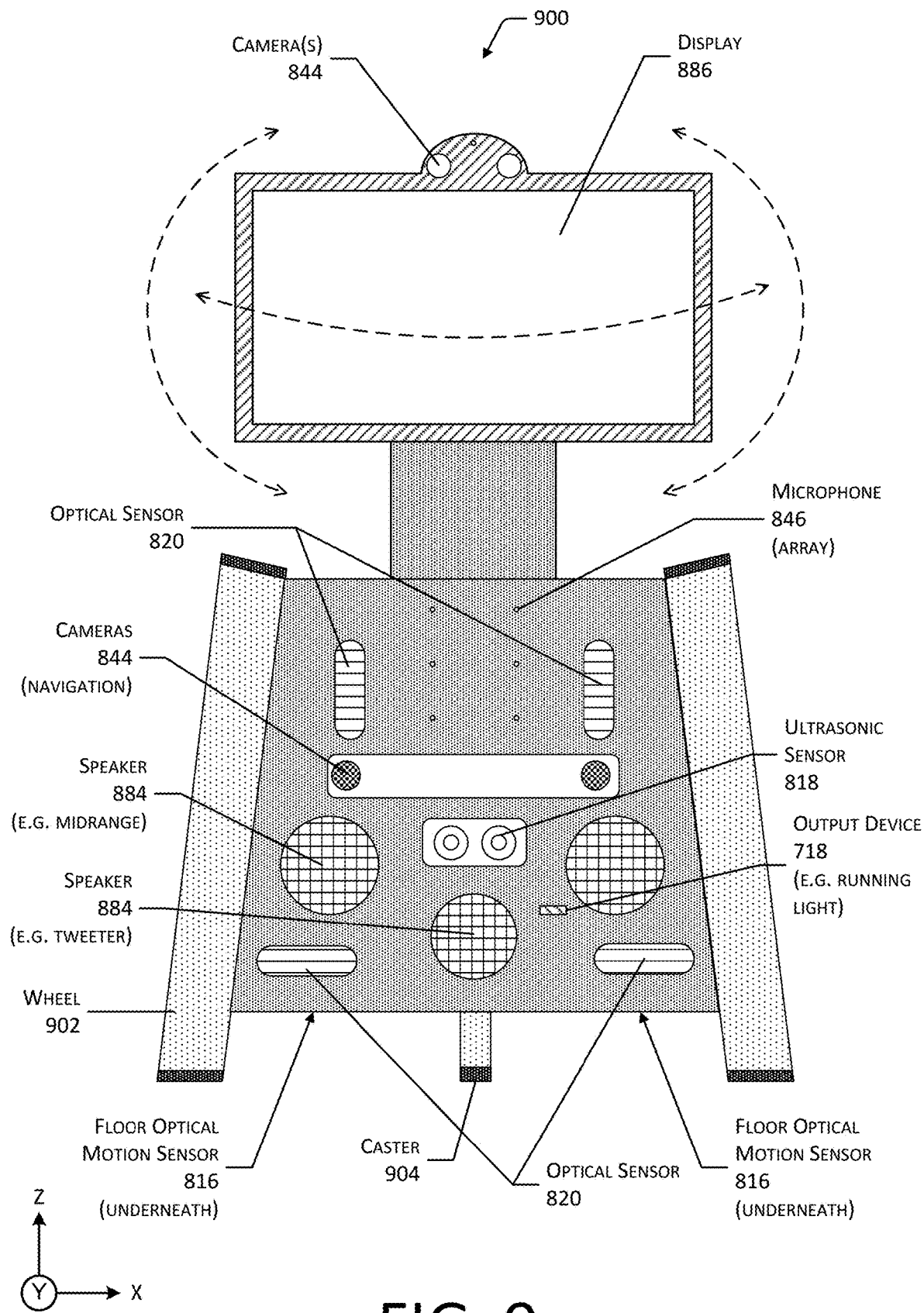
FIG. 9 is a front view of the AMD, according to some implementations.

FIG. 9 is a front view 900 of the AMD 106, according to some implementations. In this view, the wheels 902 are depicted on the left and right sides of a lower structure. As illustrated here, the wheels 902 are canted inwards towards an upper structure. In other implementations, the wheels 902 may be mounted vertically. The caster 904 is visible along the midline. The front section of the AMD 106 includes a variety of sensors 716. A first pair of optical sensors 820 are located along the lower edge of the front while a second pair of optical sensors 820 are located along an upper portion of the front. Between the second set of the optical sensors 820 is a microphone 846 (array).

In some implementations, one or more microphones 846 may be arranged within or proximate to the display 886. For example, a microphone 846 array may be arranged within the bezel of the display 886.

A pair of cameras 844 separated by a distance are mounted to the front of the AMD 106 and provide for stereo vision. The distance or "baseline" between the pair of cameras 844 may be between 5 and 15 centimeters (cm). For example, the pair of cameras 844 may have a baseline of 10 cm. In some implementations, these cameras 844 may exhibit a relatively wide horizontal field-of-view (HFOV). For example, the HFOV may be between 90° and 110°. A relatively wide FOV allows for easier detection of moving objects, such as users or pets that may be in the path of the AMD 106. Also, the relatively wide FOV facilitates the AMD 106 being able to detect objects when turning.

The sensor data 742 comprising images produced by this pair of cameras 844 can be used by the autonomous navigation system 732 for navigation of the AMD 106. The cameras 844 used for navigation may be of different resolution from, or sensitive to different wavelengths than, cameras 844 used for other purposes such as video communication. For example, the navigation cameras 844 may be sensitive to infrared light allowing the AMD 106 to operate in darkness, while the camera 844 mounted above the display 886 sensitive visible light and is used to generate images suitable for viewing by a person. Continuing the example, the navigation cameras 844 may have a resolution of at least 800 kilopixels each while the camera 844 mounted above the display 886 may have a resolution of at least 10 megapixels. In other implementations, navigation may utilize a single camera 844.

In this illustration, the AMD 106 may include a moveable component that comprises the display 886 and cameras 844 arranged above the display 886. The cameras 844 may operate to provide stereoimages of the physical environment 102, the user 104, and so forth. For example, an image from each of the cameras 844 above the display 886 may be accessed and used to generate stereo image data about a face of a user 104. This stereoimage data may then be used to facial recognition, user identification, gesture recognition, gaze tracking, and so forth. In other implementations, a single camera 844 may be present above the display 886.

An ultrasonic sensor 818 is also mounted on the front of the AMD 106 and may be used to provide sensor data 742 that is indicative of objects in front of the AMD 106.

One or more speakers 884 may be mounted on the AMD 106. For example, pyramid range speakers 884 are mounted on the front of the AMD 106 as well as a high range speaker 884 such as a tweeter. The speakers 884 may be used to provide audible output such as alerts, music, human speech such as during a communication session with another user, and so forth.

One or more bumper switches 814 (not shown) may be present along the front of the AMD 106. For example, a portion of the housing of the AMD 106 that is at the leading edge may be mechanically coupled to one or more bumper switches 814.

Other output devices 718, such as one or more lights 882, may be on an exterior of the AMD 106. For example, a running light may be arranged on a front of the AMD 106. The running light may provide light for operation of one or more of the cameras 844, a visible indicator to the user 104 that the AMD 106 is in operation, and so forth.

One or more of the FOMS 816 are located on an underside of the AMD 106.

Figure 10:
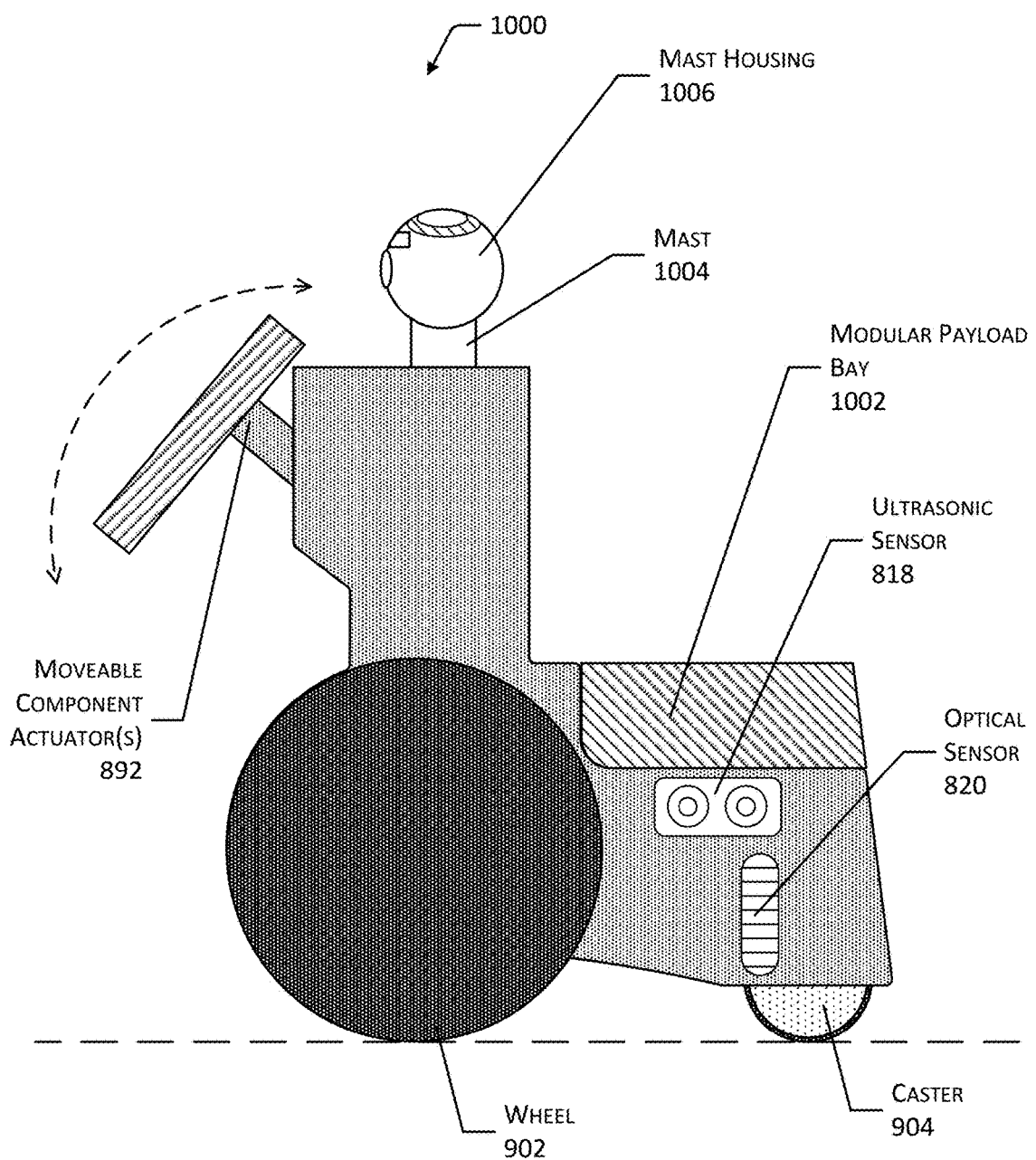
FIG. 10 is a side view of the AMD, according to some implementations.

FIG. 10 is a side view 1000 of the AMD 106, according to some implementations.

The exterior surfaces of the AMD 106 may be designed to minimize injury in the event of an unintended contact between the AMD 106 and a user 104 or a pet. For example, the various surfaces may be angled, rounded, or otherwise designed to divert or deflect an impact. In some implementations, the housing of the AMD 106, or a surface coating may comprise an elastomeric material or a pneumatic element. For example, the outer surface of the housing of the AMD 106 may be coated with a viscoelastic foam. In another example, the outer surface of the housing the AMD 106 may comprise a shape-memory polymer that upon impact forms but then over time returns to the original shape.

In this side view, the left side of the AMD 106 is depicted. An ultrasonic sensor 818 and an optical sensor 820 are present on either side of the AMD 106.

In this illustration, the caster 904 is shown in a trailing configuration, in which the caster 904 is located behind or aft of the axle of the wheels 902. In another implementation (not shown) the caster 904 may be in front of the axle of the wheels 902. For example, the caster 904 may be a leading caster 904 positioned forward of the axle of the wheels 902.

The AMD 106 may include a modular payload bay 1002 which is located within the lower structure. The modular payload bay 1002 provides one or more of mechanical or electrical connectivity with AMD 106. For example, modular payload bay 1002 may include one or more engagement features such as slots, cams, ridges, magnets, bolts, and so forth that are used to mechanically secure an accessory within the modular payload bay 1002. In one implementation, the modular payload bay 1002 may comprise walls within which the accessory may sit. In another implementation, the modular payload bay 1002 may include other mechanical engagement features such as slots into which the accessory may be slid and engage.

The modular payload bay 1002 may include one or more electrical connections. For example, the electrical connections may comprise a universal serial bus (USB) connection that allows for the transfer of data, electrical power, and so forth between the AMD 106 and the accessory.

As described above, the AMD 106 may incorporate a moveable component that includes a display 886 which may be utilized to present visual information to the user. In some implementations, the moveable component may be located with or affixed to the upper structure. In some implementations, the display 886 may comprise a touch screen that allows user input to be acquired. The moveable component is mounted on a movable mount that allows motion along one or more axes. For example, the movable mount may allow the moveable component to be tilted, rotated, and so forth by the moveable component actuators 892. The moveable component actuators 892 may be moved to provide a desired viewing angle to the user 104, to provide output from the AMD 106, and so forth. For example, the output may comprise the moveable component actuators 892 being tilted forward and backward to provide a gestural output equivalent to a human nodding their head, or panning to face the user 104.

The AMD 106 may incorporate a mast 1004. The mast 1004 provides a location from which additional sensors 716 or output devices 718 may be placed at a higher vantage point. The mast 1004 may be fixed or extensible. The extensible mast 1004 is depicted in this illustration. The extensible mast 1004 may be transitioned between a retracted state, an extended state or placed at some intermediate value between the two.

At the top of the mast 1004 may be a mast housing 1006. In this illustration, the mast housing 1006 is approximately spherical, however in other implementations other physical form factors such as cylinders, squares, or other shapes may be utilized.

The mast housing 1006 may contain one or more sensors 716. For example, the sensors 716 may include a camera 844 having a field-of-view (FOV). In another example, the sensors 716 may include an optical sensor 820 to determine a distance to an object. The optical sensor 820 may look upward, and may provide information as to whether there is sufficient clearance above the AMD 106 to deploy the mast 1004. In another example, the mast housing 1006 may include one or more microphones 846.

One or more output devices 718 may also be contained by the mast housing 1006. For example, the output devices 718 may include a camera flash used to provide illumination for the camera 844, and indicator light that provides information indicative of a particular operation of the AMD 106, and so forth.

Other output devices 718, such as one or more lights 882, may be elsewhere on an exterior of the AMD 106. For example, a light 882 may be arranged on a side of the upper structure.

In some implementations, one or more of the sensors 716, output device 718, or the mast housing 1006 may be movable. For example, the motor 880 may allow for the mast 1004, the mast housing 1006, or combination thereof to be rotated allowing the FOV to be panned from left to right.

In some implementations, a moveable component may be mounted to the mast 1004. For example, the moveable component may be affixed to the mast housing 1006. In another example, the moveable component may be mounted to a portion of the mast 1004, and so forth.

Figure 11:
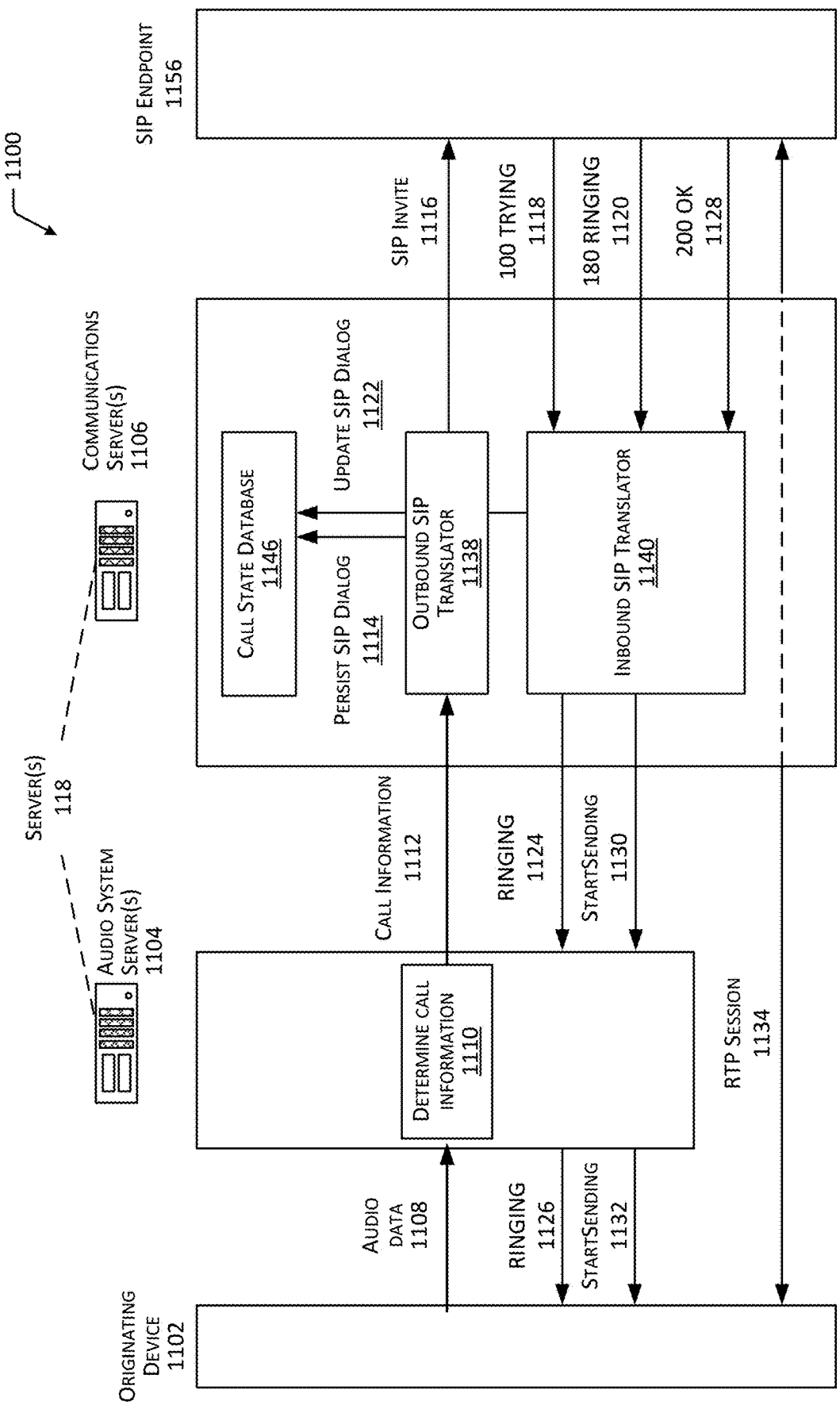
FIG. 11 illustrates an example of signaling to initiate a communication session according to embodiments of the present disclosure.

FIGS. 11-13B illustrate components that can be used to establish communication, according to some implementations. FIG. 11 illustrates an example of signaling to initiate a communication session from an originating device 11022. In one example, the audio system 122 may comprise one or more audio system server(s) 1104 that are configured to enable voice commands (e.g., perform ASR, NLU, etc. to identify a spoken command included in audio data). The communication handling system 124 may comprise one or more communications server(s) 1106 is configured to enable communication sessions (e.g., using session initiation protocol (SIP)). For example, the communications server(s) 1106 may send SIP messages to endpoints (e.g., recipient devices) in order to establish a communication session for sending and receiving audio data and/or video data. The communication session may use network protocols such as real-time transport protocol (RTP), RTP Control Protocol (RTCP), Web Real-Time communication (WebRTC), and/or the like. For example, the communications server(s) 1106 may send SIP messages to initiate a single RTP media stream between two endpoints (e.g., direct RTP media stream between the originating device 1102 and a recipient device such as the AMD 106) and/or to initiate and facilitate RTP media connections between the two endpoints (e.g., RTP media streams between the originating device 1102 and the communications server(s) 1106 and between the communications server(s) 1106 and a recipient device such as the AMD 106). During a communication session, the communications server(s) 1106 may initiate two media streams, with a first media stream corresponding to audio data sent from the originating device 1102 and to the recipient device and a second media stream corresponding to audio data sent from the recipient device and to the originating device 1102, although for ease of explanation this may be illustrated as a single RTP media stream.

As illustrated in FIG. 11, the originating device 1102 may send 1108 audio data to the audio system server(s) 1104 and the audio system server(s) 1104 may determine 1110 call information using the audio data and may send 1112 the call information to the communications server(s) 1106 (e.g., via the communications speechlet system 508). The audio system server(s) 1104 may determine the call information by performing ASR, NLU, etc., as discussed herein, and the call information may include a data source name (DSN), a number from which to call, a number to which to call, encodings, and/or additional information. For example, the audio system server(s) 1104 may identify from which phone number the originating user would like to initiate the call, to which phone number the originating user would like to initiate the call, from which device 110 the originating user would like to perform the call, etc.

While FIG. 11 illustrates the audio system server(s) 1104 sending the call information to the communications server(s) 1106 in a single step (e.g., 1112), the present disclosure is not limited thereto. Instead, the audio system server(s) 1104 may send the call information to the originating device 1102 and the originating device 1102 may send the call information to the communications server(s) 1106 in order to initiate the call without departing from the present disclosure. Thus, the audio system server(s) 1104 may not communicate directly with the communications server(s) 1106 in step 1112, or may instead instruct the originating device 1102 to communicate with the communications server(s) 1106 in order to initiate the call.

The communications server(s) 1106 may include an outbound SIP translator 1138, an inbound SIP translator 1140, and a call state database 1146. The outbound SIP translator 1138 may include logic to convert commands received from the audio system server(s) 1104 into SIP requests/responses and may handle sending outgoing SIP requests and sending responses to incoming SIP requests. After receiving the call information, the outbound SIP translator 1138 may persist 1114 a SIP dialog using the call state database 1146. For example, the DSN may include information such as the name, location, and driver associated with the call state database 1146 (and, in some examples, a user identifier and password of the originating user) and the outbound SIP translator 1138 may send a SIP dialog to the call state database 1146 regarding the communication session. The call state database 1146 may persist the call state if provided a device identifier and one of a call identifier or a dialog identifier. The outbound SIP translator 1138 may send (1210) a SIP Invite to a SIP Endpoint 1156 (e.g., a recipient device, a Session Border Controller (SBC), AMD 106, or the like). While one SIP Endpoint 1156 is illustrated, one skilled in the art will appreciate that SIP invites may be sent to more than one SIP Endpoint 1156.

The outbound SIP translator 1138 may send the SIP Invite to a separate communications system, such as a cellular service provider. The cellular service provider may send the SIP invite to the SIP Endpoint 1156. It will thus be appreciated that a cellular service provider (or other communications modality provider) may act as an intermediary between the communications server(s) 1106 and an SIP Endpoint 1156. Various APIs or other components may be used to exchange messages across different communication systems.

The inbound SIP translator 1140 may include logic to convert SIP requests/responses into commands to send to the audio system server(s) 1104 and may handle receiving incoming SIP requests and incoming SIP responses. The SIP endpoint 1156 may send 1118 a 100 TRYING message to the inbound SIP translator 1140 and may send 1120 a 180 RINGING message to the inbound SIP translator 1140. The inbound SIP translator 1140 may update 1122 the SIP dialog using the call state database 1146 and may send 1124 a RINGING message to the audio system server(s) 1104, which may send 1126 the RINGING message to the originating device 1102. Alternatively, the inbound SIP translator 1140 may send the RINGING message to the originating device 1102 without using the audio system server(s) 1104 as an intermediary.

When the communication session is accepted by the SIP endpoint 1156, the SIP endpoint 1156 may send 1128 a 200 OK message to the inbound SIP translator 1140, the inbound SIP translator 1245 may send 1130 a startSending message to the audio system server(s) 1104, and the audio system server(s) 1104 may send 1132 the startSending message to the originating device 1102. Alternatively, the inbound SIP translator 1140 may send the startSending message to the originating device 1102 without using the audio system server(s) 1104 as an intermediary. The startSending message may include information associated with an internet protocol (IP) address, a port, encoding, or the like required to initiate the communication session. Using the startSending message, the originating device 1102 may establish 1134 an RTP communication session with the SIP endpoint 1156 via the communications server(s) 1106. The RTP session may be referred to as direct audio communication functionality as speech captured by one device of the RTP session may be sent as audio data to another device of the RTP session, which outputs the speech to a recipient user.

For ease of explanation, the disclosure illustrates the system using SIP. However, the disclosure is not limited thereto and the system may use any communication protocol for signaling and/or controlling communication sessions without departing from the disclosure. Similarly, while some descriptions of the communication sessions refer only to audio data, the disclosure is not limited thereto and the communication sessions may include audio data, video data, and/or any other multimedia data without departing from the disclosure.

Figure 12A:
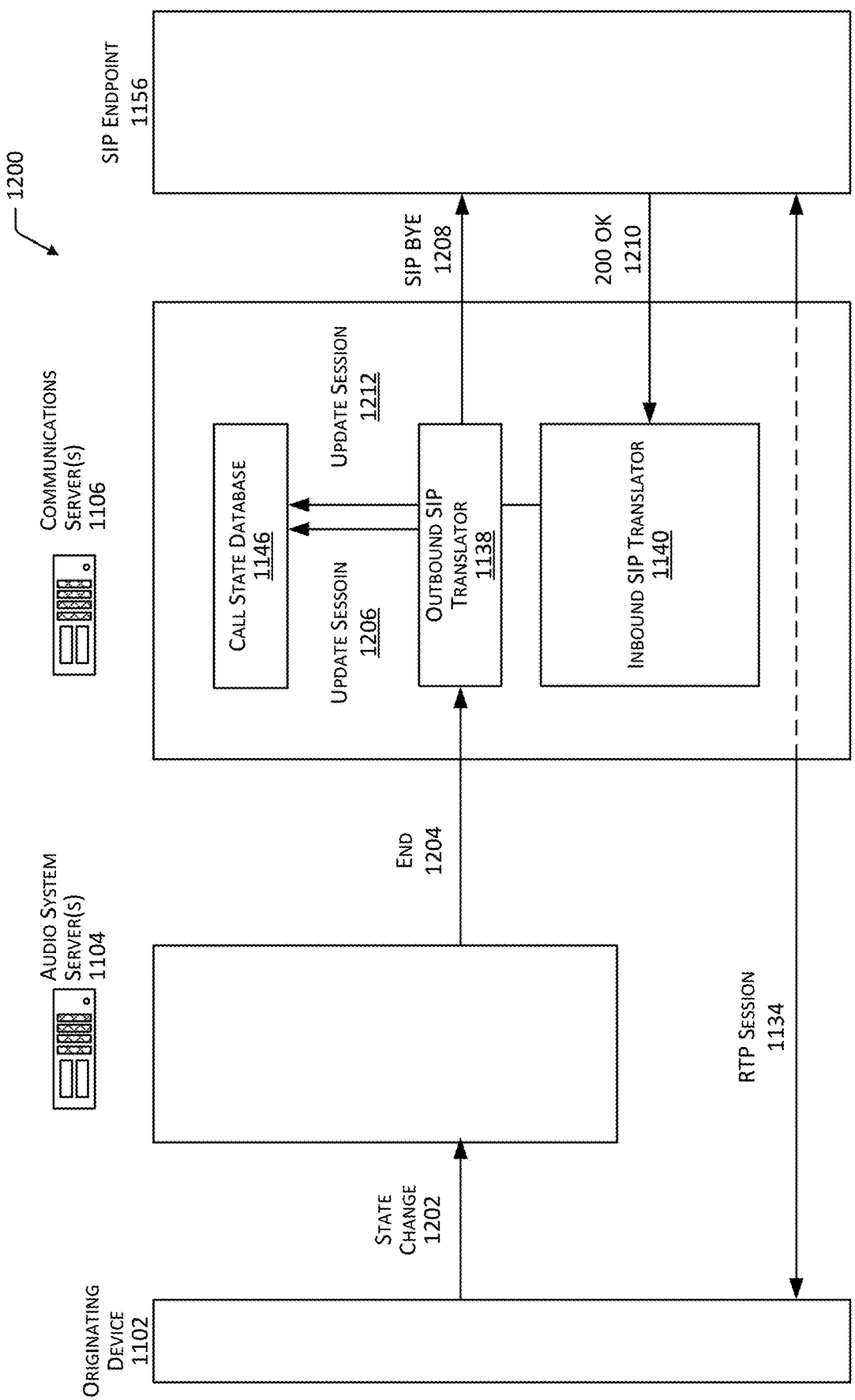
FIGS. 12A and 12B illustrate examples of signaling to end a communication session according to embodiments of the present disclosure.
Figure 12B:
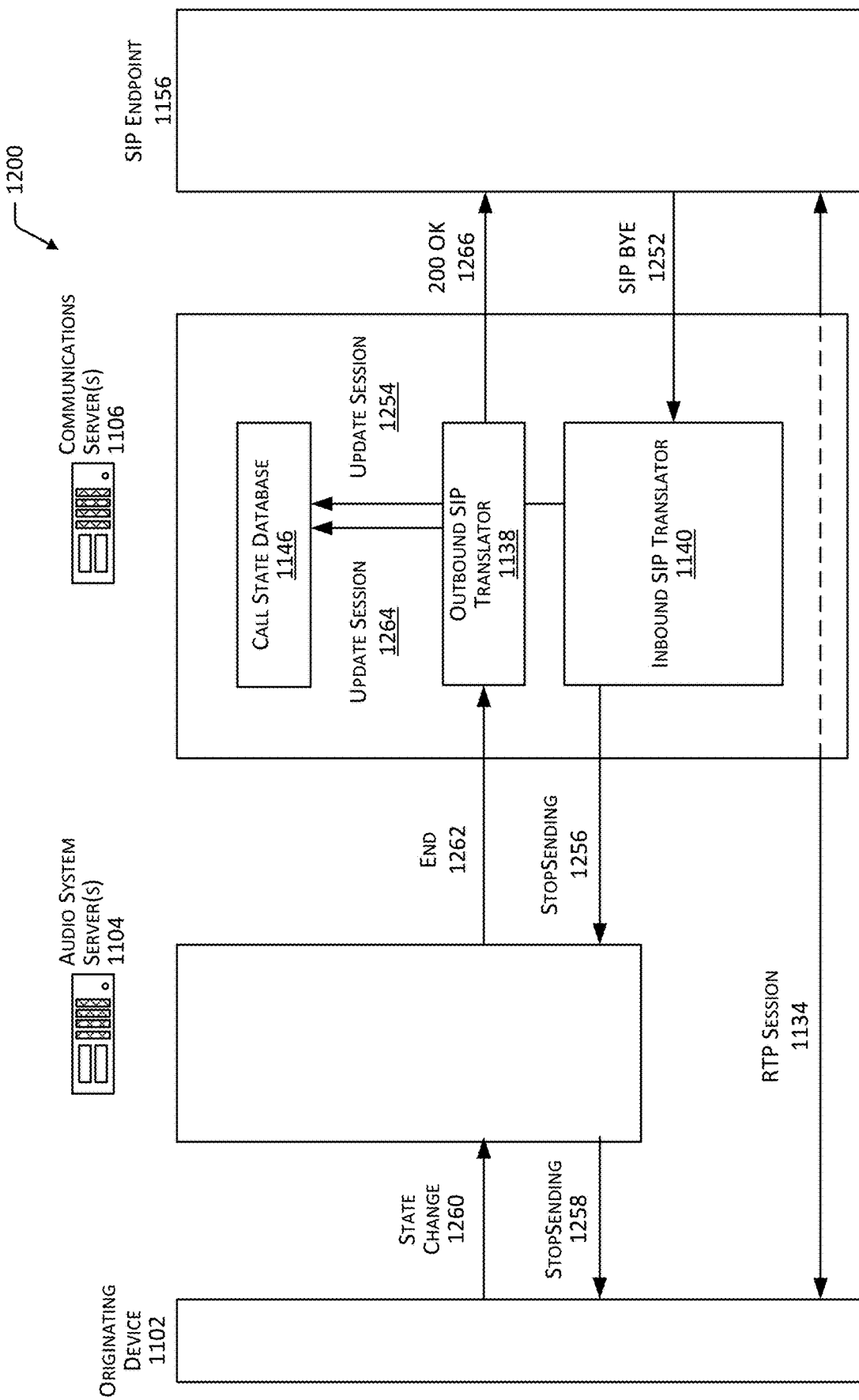

FIGS. 12A and 12B illustrate examples of signaling to end a communication session according to one implementation. After establishing the RTP communication session 1134 between the originating device 1102 and the SIP endpoint 1156, the RTP communication session may be ended by the originating user inputting a command, to end the call, to the originating device 1102, as illustrated in FIG. 12A, or a recipient user inputting a command, to end the call, to the SIP endpoint 1156, as illustrated in FIG. 12B.

As illustrated in FIG. 12A, the originating device 1102 may send 1202 a state change message to the audio system server(s) 1104 and the audio system server(s) 1104 may send 1204 an end message to the communications server(s) 1106. The outbound SIP translator 1138 may update 1206 the session using the call state database 1146 and may send 1208 a SIP BYE message to the SIP endpoint 1156. The SIP endpoint 750 may send 1210 a 200 OK message to the inbound SIP translator 1140 and the inbound SIP translator 1140 may update 1212 the session using the call state database 1146. In some examples, the inbound SIP translator 1140 may send the 200 OK message to the originating device 1102 to confirm the communication session has been ended. Thus, the RTP communication session 1134 may be ended between the originating device 1102 and the SIP endpoint 1156.

As illustrated in FIG. 12B, the SIP endpoint 1156 may send 1252 a SIP BYE message to the inbound SIP translator 1140 and the inbound SIP translator 1140 may update 1254 the session using the call state database 1146. The inbound SIP translator 1140 may send 1256 a stopSending message to the audio system server(s) 1104 and the audio system server(s) 1104 may send 1258 the stopSending message to the originating device 1102. The originating device 1102 may send 1260 a state change message to the audio system server(s) 1104 and the audio system server(s) 1104 may send 1262 an End message to the outbound SIP translator 1138, the End message including a DSN. The outbound SIP translator 1138 may then update 1264 the session using the call state database 1146, and send 1266 a 200 OK message to the SIP endpoint 1156. Thus, the RTP communication session 1134 may be ended between the originating device 1102 and the SIP endpoint 1156.

While FIGS. 12A and 12B illustrate the audio system server(s) 1104 acting as an intermediary between the originating device 1102 and the communications server(s) 1106, the present disclosure is not limited thereto. Instead, steps 1202 and 1204 may be combined into a single step and the originating device 1102 may send the state change message and/or the End message to the communications server(s) 1106 without using the audio system server(s) 1104 as an intermediary. Similarly, steps 1266 and 1258 may be combined into a single step and the communications server(s) 1106 may send the StopSending message to the originating device 1102 without using the audio system server(s) 1104 as an intermediary, and/or steps 1260 and 1262 may be combined into a single step and the originating device 1102 may send the state change message and/or the End message to the communications server(s) 1106 without using the audio system server(s) 1104 as an intermediary.

While FIGS. 12, 12A, and 12B illustrate the RTP communication session 1134 being established between the originating device 1102 and the SIP endpoint 1156, the present disclosure is not limited thereto and the RTP communication session 1134 may be established between the originating device 1102 and a telephone network associated with the SIP endpoint 1156 without departing from the present disclosure.

Figure 13A:
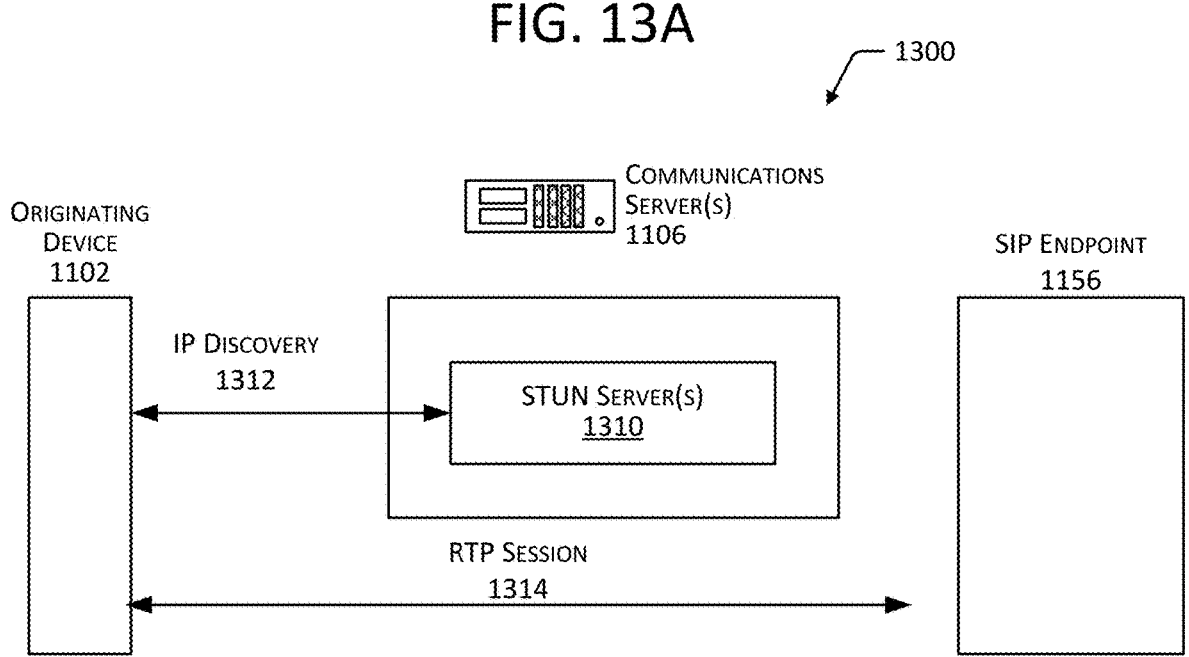
FIGS. 13A and 13B illustrate examples of establishing media connections between devices according to embodiments of the present disclosure.
Figure 13B:
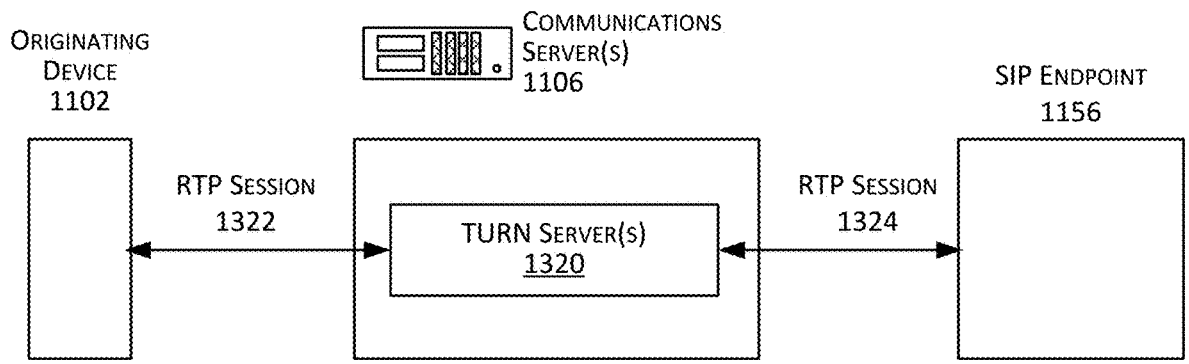

FIGS. 13A and 13B illustrate examples of establishing media connections between devices according to one implementation. In some examples, the originating device 1102 may have a publicly accessible IP address and may be configured to establish the RTP communication session directly with the SIP endpoint 1156. To enable the originating device 1102 to establish the RTP communication session, the communications server(s) 1106 may include Session Traversal of User Datagram Protocol (UDP) Through Network Address Translators (NATs) server(s) (e.g., STUN server(s) 1310). The STUN server(s) 1310 may be configured to allow NAT clients (e.g., an originating device 1102 behind a firewall) to setup calls to a VoIP provider hosted outside of the local network by providing a public IP address, the type of NAT they are behind, and a port identifier associated by the NAT with a particular local port. As illustrated in FIG. 13A, the originating device 1102 may perform 1312 IP discovery using the STUN server(s) 1310 and may use this information to set up an RTP communication session 1314 (e.g., UDP communication) between the originating device 1102 and the SIP endpoint 1156 to establish a call.

In some examples, the originating device 1102 may not have a publicly accessible IP address. For example, in some types of NAT the originating device 1102 cannot route outside of the local network. To enable the originating device 1102 to establish an RTP communication session, the communications server(s) 1106 may include Traversal Using relays around NAT (TURN) server(s) 1320. The TURN server(s) 1320 may be configured to connect the originating device 1102 to the SIP endpoint 1156 when the originating device 1102 is behind a NAT. As illustrated in FIG. 13B, the originating device 1102 may establish 1322 an RTP session with the TURN server(s) 1320 and the TURN server(s) 1320 may establish 1324 an RTP session with the SIP endpoint 1156. Thus, the originating device 1102 may communicate with the SIP endpoint 1156 via the TURN server(s) 1320. For example, the originating device 1102 may send audio data to the communications server(s) 1106 and the communications server(s) 1106 may send the audio data to the SIP endpoint 1156. Similarly, the SIP endpoint 1156 may send audio data to the communications server(s) 1106 and the communications server(s) 1106 may send the audio data to the originating device 1102.

In some examples, the system may establish communication sessions using a combination of the STUN server(s) 1310 and the TURN server(s) 1320. For example, a communication session may be more easily established/configured using the TURN server(s) 1320, but may benefit from latency improvements using the STUN server(s) 1310. Thus, the system may use the STUN server(s) 1310 when the communication session may be routed directly between two devices and may use the TURN server(s) 1320 for all other communication sessions. Additionally or alternatively, the system may use the STUN server(s) 1310 and/or the TURN server(s) 1320 selectively based on the communication session being established. For example, the system may use the STUN server(s) 1310 when establishing a communication session between two devices (e.g., point-to-point) within a single network (e.g., corporate LAN and/or WLAN), but may use the TURN server(s) 1320 when establishing a communication session between two devices on separate networks and/or three or more devices regardless of network(s). When the communication session goes from only two devices to three or more devices, the system may need to transition from the STUN server(s) 1310 to the TURN server(s) 1320. Thus, if the system anticipates three or more devices being included in the communication session, the communication session may be performed using the TURN server(s) 1320. When the communication session goes from three or more devices to only two devices, the system may need to transition from the TURN server(s) 1320 to the STUN server(s) 1310.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
    receiving a communication request from a caller device to establish communication with a first user using a first communication modality, wherein the first user is associated with a first user account;
    determining a first device that is associated with the first user account;
    determining the first device is present in an environment associated with the first user account;
    determining a first location of the first device within the environment;
    sending a first instruction to search at least a portion of the environment with the first device to find the first user;
    determining the first user is using a second device that is at a second location;
    receiving, from the second device, data indicative of an acceptance of the communication request by the first user;
    establishing, with the second device, the communication with the caller device using a second communication modality, wherein the second communication modality is different than the first communication modality;
    based on the second device establishing the communication with the caller device, sending a second instruction to discontinue the search of the at least portion of the environment;
    based on the second device establishing the communication with the caller device, sending a third instruction to move the first device to the second location;
    determining the first device has found the first user at the second location within the environment; and
    responsive to the determining the first device has found the first user:
        discontinuing the communication using the second communication modality; and
        establishing the communication using the first communication modality.

2. The method of claim 1, the determining the first location of the first device comprising:
    sending a request to a system for location data, wherein the system comprises one or more of a process executing on at least one processor of the first device or on at least one processor of a computing device in communication with the first device; and
    receiving the location data, wherein the location data is indicative of one or more of geographic coordinates, coordinates with respect to a designated point, coordinates with respect to an occupancy map, or a room name.

3. The method of claim 1, the determining the first user is present at the second location further comprising:
    determining that the first user is depicted in one or more images obtained by the first device at the second location.

4. The method of claim 1, wherein the first instruction further comprises one or more of:
    an instruction to move the first device along a previously defined search route through the environment until the first user is found,
    an instruction to request input from a second user as to a location of the first user and then to move the first device to that location, or
    an instruction to receive first data from the caller device that is indicative of an expected location of the first user and then to move the first device to the expected location.

5. The method of claim 1, further comprising:
    receiving, from the first device, audio data of an utterance by the first user; and
    analyzing, using an audio system, the audio data to determine first data indicative of intent of the utterance to establish the communication with the caller device using the first communication modality.

6. The method of claim 1, further comprising:
    presenting, using the first device at the second location, output indicative of the communication request to establish the communication, using the first communication modality, between the first device and the caller device.

7. The method of claim 1, wherein the discontinuing the communication using the second communication modality and establishing the communication using the first communication modality is responsive to:
  presenting, using an output device of the first device, a prompt;
  receiving input data from an input device of the first device; and
  determining, responsive to the input data, the first user has approved transition to the first communication modality.

8. The method of claim 1, further comprising:
  determining the caller device is associated with the first user account as being approved for automatic acceptance of requests to establish communication;
  generating obscured video data in which video data produced by one or more cameras of the first device has been processed with a blurring algorithm; and
  establishing the communication using the first communication modality between the first device and the caller device, wherein the first communication modality comprises a video call using the obscured video data.

9. The method of claim 1, further comprising:
  receiving data that is indicative of the first device performing a task for a second user from a first time until a second time; and
  wherein the searching is delayed until after the second time.

10. A system comprising:
  at least one processor;
  at least one memory comprising instructions that, when executed by the at least one processor, cause the system to:
    receive a request from a first device to establish communication with a first user that is associated with a first user account, using a first communication modality;
    determine a second device is associated with the first user account;
    determine the second device is present in an environment associated with the first user account;
    determine a first location of the second device within the environment;
    receive, from the second device, data indicative of an acceptance of the request by the first user;
    establish, with the second device, the communication between the first device and the second device using a second communication modality, wherein the second communication modality is different than the first communication modality;
    receive first data obtained from other devices within the environment;
    determine, based on the first data, that the first user is at the first location;
    determine a route through the environment based at least in part on the determination that the first user is at the first location;
    generate instructions to move a third device along the route through the environment to the first location;
    determine the third device has found the first user at the first location; and
    responsive to the determination that the third device has found the first user:
      discontinue the communication using the second communication modality between the first device and the second device; and
      establish the communication using the first communication modality from the second device to the third device.

11. The system of claim 10, wherein the at least one memory further comprises instructions that, when executed by the at least one processor, further cause the system to one or more of:
  determine that the first user is beyond a first threshold distance from the third device,
  determine that a second user is beyond a second threshold distance from the third device, or
  determine the first user is using another device that is at the first location.

12. The system of claim 10, wherein the at least one memory further comprises instructions that, when executed by the at least one processor, further cause the system to one or more of:
  request input from a second user as to a location of the first user and then move the third device to the location, or
  receive data from the first device that is indicative of an expected location and move the third device to the expected location.

13. The system of claim 10, wherein the at least one memory further comprises instructions that, when executed by the at least one processor, further cause the system to:
  present, using the second device, output indicative of the request to establish the communication using the second communication modality.

14. The system of claim 10, wherein the at least one memory further comprises instructions that, when executed by the at least one processor, further cause the system to:
  present, using an output device of the third device, a prompt;
  receive input data from an input device of the third device; and
  determine responsive to the input data, approval to establish the communication using the first communication modality.

15. The system of claim 10, wherein the at least one memory further comprises instructions that, when executed by the at least one processor, further cause the system to:
  determine the third device is performing a task, wherein the task is performed from a first time until a second time; and
  delay moving the third device along the route until after the second time.

16. The system of claim 10, the determination that the third device found the first user present at the first location further comprises:
  determine that the first user is depicted in one or more images obtained by the third device at the first location.

17. A method comprising:
  receiving, from a caller device, a first request to establish video communication with a first user who is associated with a first user account;
  determining a first device that is associated with the first user account;
  determining the first device is present in an environment associated with the first user account;
  determining a first location of the first device within the environment;
  receiving first data from a second device that is indicative of an acceptance of the first request by the first user at a second location;
  establishing an audio communication with the caller device and the second device;
  determining a route through the environment based at least in part on the first data indicative of the first user accepting the first request at the second location;

sending an instruction to the first device to move along the route to find the first user;
receiving second data that indicates the first device has found the first user at the second location;
receiving third data from the first device that is indicative of a second request to establish the video communication with the first device;
establishing the video communication with the caller device and the first device; and
disconnecting the audio communication with the caller device and the second device.

18. The method of claim 17, further comprising:
receiving a third request to establish bidirectional video communication with the first user who is associated with the first user account;
retrieving information indicative of a third device that is associated with the first user account and located in the environment, wherein the information is indicative of the third device being at a third location in the environment and the third device includes a camera and a display;
receiving fifth data from the third device that is indicative of an acceptance of the third request by the first user; and
establishing the bidirectional video communication with the first user using the third device.

19. The method of claim 17, further comprising:
sending an instruction to the first device to follow the first user.

20. The method of claim 17, further comprising:
determining that the first user is depicted in one or more images obtained by the first device at the second location.

* * * * *

UNITED STATES PATENT AND TRADEMARK OFFICE
CERTIFICATE OF CORRECTION

| | | |
|---|---|---|
| PATENT NO. | : 11,368,497 B1 | Page 1 of 1 |
| APPLICATION NO. | : 16/134643 | |
| DATED | : June 21, 2022 | |
| INVENTOR(S) | : Sathyanarayana Rao et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 190 days.

Signed and Sealed this
Tenth Day of June, 2025

Coke Morgan Stewart
*Acting Director of the United States Patent and Trademark Office*